United States Patent
Nassi et al.

(10) Patent No.: US 11,195,394 B2
(45) Date of Patent: Dec. 7, 2021

(54) ANALYZING RADIO TRANSMISSION FOR DETECTING WHETHER A DRONE IS FILMING A POINT OF INTEREST

(71) Applicants: B. G. NEGEV TECHNOLOGIES AND APPLICATIONS LTD., Beer Sheva (IL); YEDA RESEARCH AND DEVELOPMENT CO. LTD., Rehovot (IL)

(72) Inventors: Ben Nassi, Ramat Gan (IL); Adi Shamir, Rehovot (IL); Yuval Elovici, Moshav Arugot (IL)

(73) Assignees: B. G. NEGEV TECHNOLOGIES AND APPLICATIONS LTD., Beer Sheva (IL); YEDA RESEARCH AND DEVELOPMENT CO., LTD., Rehovot (IL)

( * ) Notice: Subject to any disclaimer, the term of this patent is extended or adjusted under 35 U.S.C. 154(b) by 0 days.

(21) Appl. No.: 16/964,799

(22) PCT Filed: Jan. 24, 2019

(86) PCT No.: PCT/IL2019/050100
§ 371 (c)(1),
(2) Date: Jul. 24, 2020

(87) PCT Pub. No.: WO2019/145953
PCT Pub. Date: Aug. 1, 2019

(65) Prior Publication Data
US 2021/0049883 A1 Feb. 18, 2021

Related U.S. Application Data

(60) Provisional application No. 62/668,282, filed on May 8, 2018, provisional application No. 62/621,062, filed on Jan. 24, 2018.

(51) Int. Cl.
*G08B 13/19* (2006.01)
*G06F 21/83* (2013.01)
(Continued)

(52) U.S. Cl.
CPC ..... *G08B 13/19686* (2013.01); *G06F 21/629* (2013.01); *G06F 21/83* (2013.01); *G08B 13/1965* (2013.01)

(58) Field of Classification Search
USPC .......................................... 348/143
See application file for complete search history.

(56) References Cited

U.S. PATENT DOCUMENTS

| | | | |
|---|---|---|---|
| 7,500,008 B1 * | 3/2009 | Jerrard-Dunne | G06F 21/554 709/217 |
| 2005/0071604 A1 * | 3/2005 | Tanner, Jr. | H04N 1/00037 712/220 |

(Continued)

OTHER PUBLICATIONS

Nassi et al., "Game of Drones—Detecting Streamed POI from Encrypted FPV Channel", Website. IsraelDefense. [retrieved on Jan. 16, 2018 ]. Retrieved from < https://www.israeldefense.co.il/en/node/32670 > IsraelDefense.

*Primary Examiner* — Mikhail Itskovich
(74) *Attorney, Agent, or Firm* — Novick, Kim & Lee, PLLC; Jae Youn Kim

(57) ABSTRACT

A system and method for identifying if a drone is illegitimately video streaming a location, object or person. An interceptor intercepts radio transmissions and identifies if a radio transmission is an FPV video transmission. A watermarker is used for emitting a periodic physical stimulus at a given frequency for a given duration. The system then verifies if there is a correlation between the video transmission and the periodic physical stimulus; and issues a privacy (Continued)

invasion attack notification if such a correlation is determined between the video transmission and the periodic physical stimulus.

20 Claims, 21 Drawing Sheets

(51) Int. Cl.
*G06F 21/62* (2013.01)
*G08B 13/196* (2006.01)

(56) References Cited

U.S. PATENT DOCUMENTS

| | | | |
|---|---|---|---|
| 2005/0144454 A1* | 6/2005 | Hare | G06T 1/0085 |
| | | | 713/176 |
| 2014/0229970 A1* | 8/2014 | Besehanic | H04N 21/25883 |
| | | | 725/20 |
| 2017/0316537 A1* | 11/2017 | Drzymala | G08B 13/2494 |
| 2018/0196417 A1* | 7/2018 | Iagnemma | G05D 1/0027 |
| 2018/0234496 A1* | 8/2018 | Ratias | A63F 13/60 |

* cited by examiner

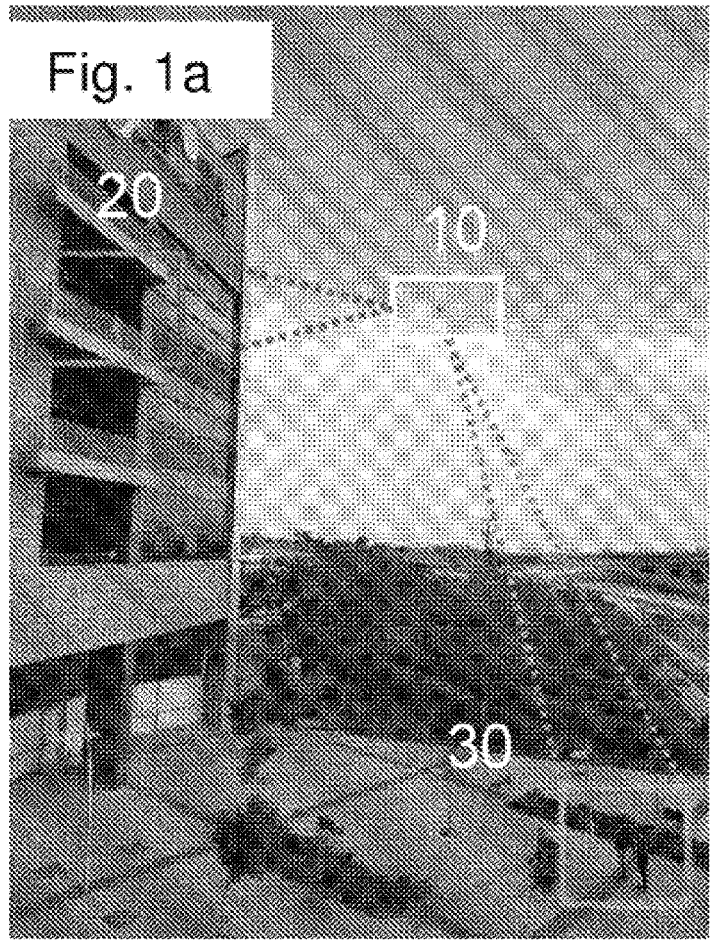
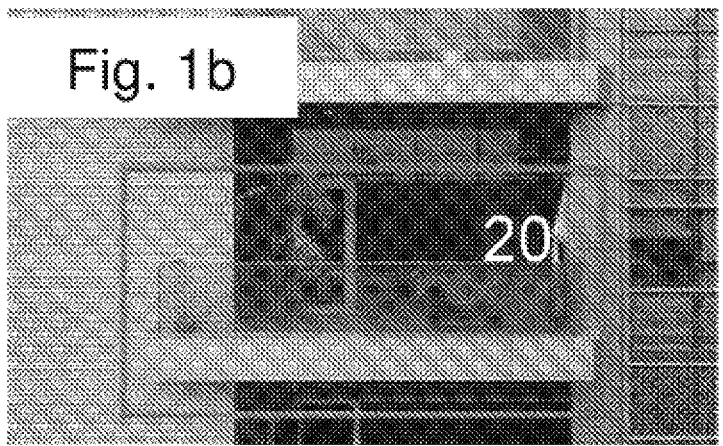

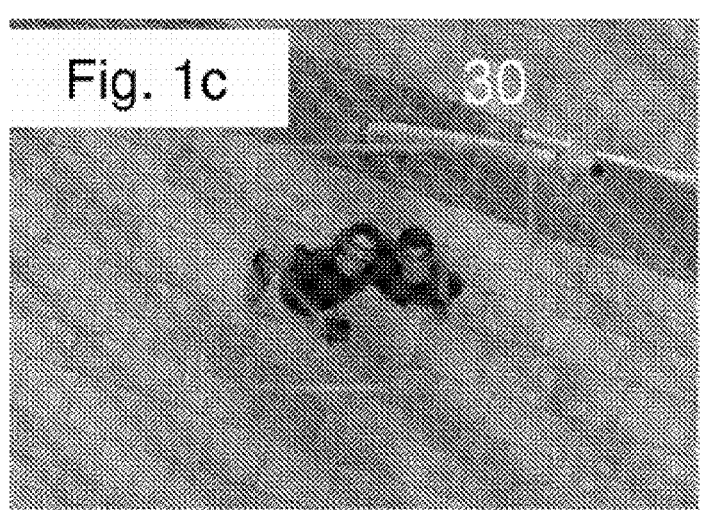

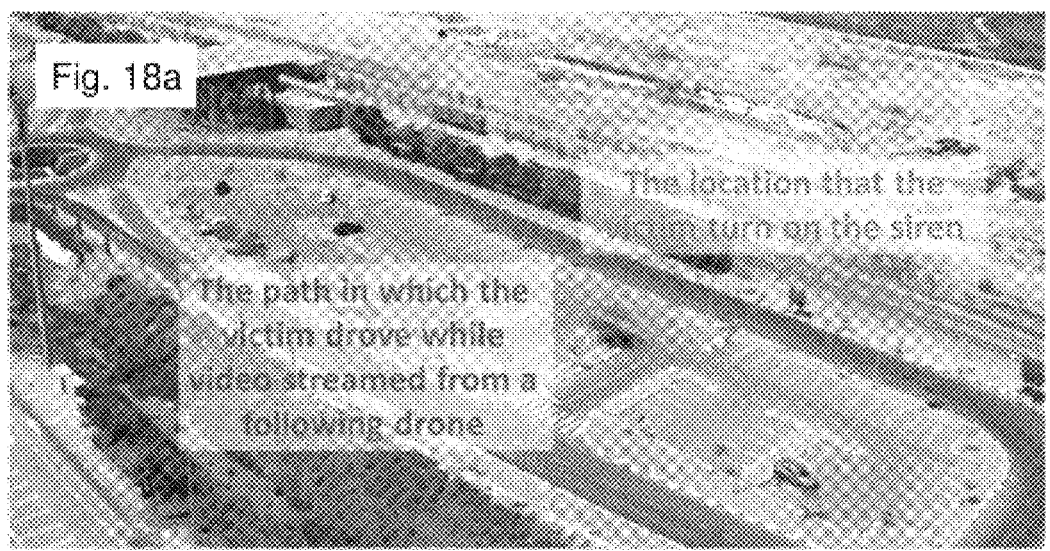
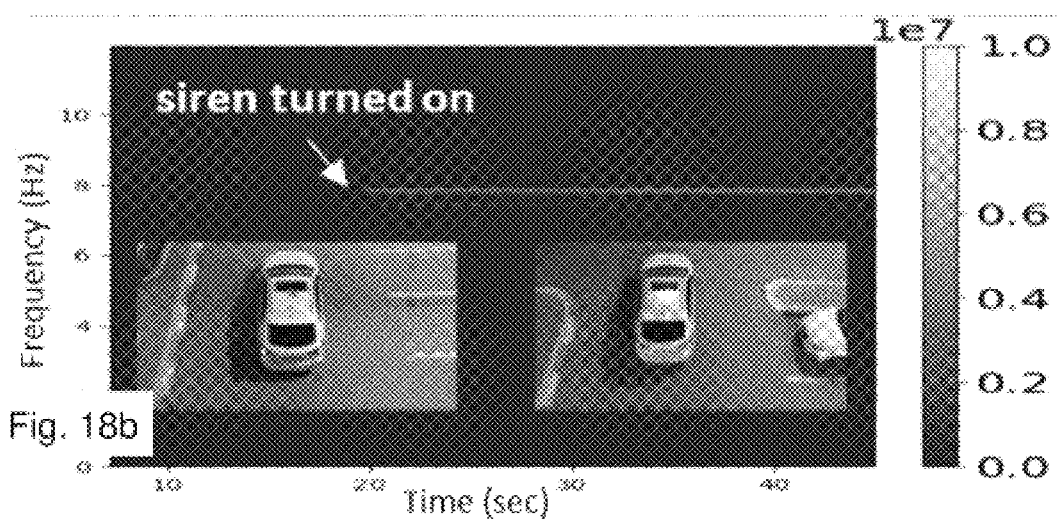

ANALYZING RADIO TRANSMISSION FOR DETECTING WHETHER A DRONE IS FILMING A POINT OF INTEREST

CROSS-REFERENCE TO RELATED APPLICATIONS

This application is a national stage application under 35 U.S.C. § 371 of PCT/IL2019/050100 filed on 24 Jan. 2019 and subsequently published as WO 2019145953 on Aug. 7, 2019, said PCT application claiming the benefit of U.S. provisional application No. 62/621,062 filed on 24 Jan. 2018 and of U.S. provisional application No. 62/668,282 filed on 8 May 2018 according to 35 U.S.C. § 119 (e), all incorporated herein by reference.

TECHNICAL FIELD

The present invention relates radio analysis in general, and in particular to a system and method for detecting whether anybody is illegitimately shooting video of a point of interest.

BACKGROUND ART

Recent years has seen a proliferation of unmanned aerial vehicles (UAV) or as they are commonly referred to "drones" for a variety of military, commercial and private usages. With most countries having an "open skies" policy, and drones being used for more and more tasks for both business and pleasure, when we see a drone nearby the question arises whether the drone is here for a legitimate purpose (delivering pizza, shooting a video of its operator or a public area) or whether the drone is being used for an illegitimate use (shooting video of a private property, spying on someone, a sensitive commercial entity etc.).

Over the years, many methods have been suggested to detect the presence of a drone in a specific location, however since populated areas are no longer off limits for drone flights, the previously suggested methods for detecting a privacy invasion attack are irrelevant, as a drone may have the right to fly in a certain area. There is thus a need in the industry to being able to fine out whether a drone is filming a protected point of interest (POI) or not. The POI may be a territory or a person.

FIG. 1a illustrates such an example. A drone 10 at a given location might be pointing its camera illegitimately (and illegally) into a POI 20 in this case someone's bedroom (under privacy attack), or the drone 10 might be pointing its camera legitimately to a legitimate target 30, in this case to take a picture of its operators, for example. FIG. 1b is a close-up of the POI 20 under a privacy attack, and FIG. 1c is a close-up of the legitimate target 30 of the drone's 10 camera.

Modern drones 10 provide video piloting capabilities (FPV channel), in which a live video stream is sent from the drone 10 to the pilot (operator) on the ground, enabling the pilot to fly the drone 10 as if he/she was onboard (instead of looking at the drone 10 from the pilot's actual ground position). This allows a pilot to control a drone 10 using a remote controller, as demonstrated in FIG. 2a. A drone's 10 camera captures images that are represented binary, a video encoder encodes the images, the images are encrypted, modulated and sent to the drone's 10 remote control 40 held by its operators. The drone's 10 operators can watch the received video in real-time and send to the drone 10 maneuvering commands that are encrypted, modulated and transmitted via the remote control 40.

A typical drone 10 FPV channel is intended to be used for two purposes: (1) video streaming using data that is captured by the drone's 10 camera and sent to the pilot's controller, and (2) maneuvering and controlling the drone 10 using commands sent from the controller to the drone 10. Streamed video needs to be compressed before it is transmitted in order to comply to given bandwidth constraints and reduce power consumption (critical for a drone 10).

Video encoding begins with a raw image captured from a camera. The camera converts analog signals generated by striking photons into a digital image format. Video is simply a series of such images generally captured five to 120 times per second (referred to as frames per second or FPS). The stream of raw digital data is then processed by a video encoder in order to decrease the amount of traffic that is required to transmit a video stream. Video encoders use two techniques to compress a video: intra-frame coding and inter-frame coding.

Intra-frame coding creates an I-frame, a time periodic reference frame that is strictly intra-coded. The receiver decodes an I-frame without additional information. Intra-frame prediction exploits spatial redundancy, i.e., correlation among pixels within a frame, by calculating prediction values through extrapolation from already coded pixels, for effective delta coding (the process is described in Appendix I). Interframe coding exploits temporal redundancy by using a buffer of neighboring frames that contains the last M number of frames and creates a delta frame. A delta frame is a description of a frame as a delta of another frame in the buffer. The receiver decodes a delta frame using a previously received reference frame. There are two main types of delta frames: P-frames and B-frames. P-frames can use previous frames as data in the decompressing process and are more compressible than I-frames. B-frames can use both previous and upcoming frames for data reference to obtain the greatest amount of data compression (the process is described in Appendix I).

The order in which I, B, and P-frames are arranged is specified by a GOP (group of pictures) structure. A GOP is a collection of successive pictures within a coded video stream. It consists of two I-frames, one at the beginning and one at the end. In the middle of the GOP structure, P and B-frames are ordered periodically. An example of a GOP structure can be seen in FIG. 2b. Occasionally B-frames are not used in real-time streaming in order to minimize delays.

There are two types of technologies popular the FPV market (as of 2018): Wi-Fi FPV and analog FPV. Wi-Fi FPV is, by far, the most popular method used to include FPV in budget remote-controlled (RC) drones 10 because: (1) any Android™/iOS™ smartphone (or tablet) on the market can be used to operate the drone 10; (2) the only additional hardware required is a Wi-Fi FPV transmitter (which is connected to the camera of the drone 10), instead of an additional controller with a screen that is equipped with a dedicated radio transceiver which is required by other types of FPV (e.g., 2.4/5.8 GHz analog FPV); (3) drone 10 manufacturers were able to boost the Wi-Fi FPV drone flight range to four kilometers using dedicated hardware (as of 2018); and (4) Wi-Fi FPV drones 10 support 4K resolution. Some types of drones are considered pure Wi-Fi FPV drones (e.g., DJI Spark™, DJI Phantom 3 SE™, Parrot Bebop 2™), and other kinds contain Wi-Fi FPV along with their dedicated analog FPV (e.g., DJI Mavic Pro™, DJI Mavic Air™). Almost every FPV-enabled drone 10 selling for less than $100 uses Wi-Fi FPV, and there are dozens of kinds of Wi-Fi FPV drones available for purchase ranging from $30 to hundreds and thousands of dollars.

SUMMARY OF INVENTION

The present invention relates to a computing system comprising at least one processor; and at least one memory communicatively coupled to the at least one processor comprising computer-readable instructions that when executed by the at least one processor cause the computing system to implement a method of detecting a privacy invasion attack of a point of interest (POI). A POI can be a location, an object a person or any combination thereof. For example, a factory, an office, a military base, a house, an apartment, a person, a vehicle (parked or in movement), a sport team (players, facilities) etc.

The method comprises the following steps:

Intercepting radio transmissions by an interceptor and identifying if a radio transmission is a First-Person-View (FPV) video transmission. The interceptor comprises an RF scanner, an antenna and amplifier.

If not already active, triggering a periodic physical stimulus associated with said POI, at a given frequency for a given duration. The periodic physical stimulus referred to as "watermarker" is closely associated with the POI, that is, it's inside the POI (location) or as close as possible to the POI (on top of a vehicle, on a wall or roof of a building or house, worn by a person, carried by a person etc.). The watermarker can be active permanently or triggered only when a suspicious radio transmission is identified.

Next, the system verifies if there is a correlation between the radio transmission and the periodic physical stimulus, and if such a correlation is determined than the system determines that a privacy invasion attack is occurring and issues a notification. The notification can be a message to a person and/or responsible authorities, execution of a pre-defined procedure (for example, if a bedroom is filmed in an apartment, than electric shutters can be activated to block the window; sounding an alarm; activating measures to neutralize or destroy the drone etc.), registration in a log (for example, in cases where one wants to know that the POI was filmed, but doesn't wish to take any responsive measures immediately) or any combination thereof.

In some embodiments, the video transmission is from a camera on an Unmanned Aerial Vehicle (UAV) of any type, technology or size.

In some embodiments, the FPV video transmission is a Wi-Fi FPV video transmission.

In some embodiments, identifying if a radio transmission is an FPV video transmission is done by first assessing that a connected Media Access Control (MAC) address associated with the radio transmission is of a moving object, and then if the transmission rates correspond to known UAV frames per second (FPS) video rates.

In some embodiments, the periodic physical stimulus is a square wave.

In some embodiments, the periodic physical stimulus is a flickering light. Flickering light can be obtained by using any combination of LED strips, smart bulbs, a portable projector, smart film and other devices that can be programmed to change their color.

In some embodiments, the flickering light is an infra-red light.

In some embodiments, the flickering light alternates between two shades of the same color, such as the human eye cannot differentiate between the two shades.

In some embodiments, more than one periodic physical stimulus can be used. When using multiple periodic physical stimuli, it is possible to calculate additional information such as: the angle between the UAV and a periodic physical stimulus, the UAV's distance to a periodic physical stimulus and longitude, latitude and altitude of the UAV.

In another aspect the present invention relates to a computer system for identification of privacy invasion attacks of a POI, comprising a processor and a memory communicatively coupled to the processor, the system comprising:

an interceptor comprising an RF scanner, an antenna and amplifier;

a watermarker associated with said POI for emitting a periodic physical stimulus at a given frequency for a given duration; and a controller adapted for reviewing radio transmissions read by the interceptor and identifying if a radio transmission is an FPV video transmission; if the watermarker is not active, activating the watermarker; verifying if there is a correlation between the video radio transmission and the periodic physical stimulus; and issuing a privacy invasion attack notification if a correlation is determined between the video radio transmission and the periodic physical stimulus.

BRIEF DESCRIPTION OF DRAWINGS

FIG. 1a shows a drone that in the same position could be filming illegitimately a person's flat (shown in FIG. 1b) or could be filming legitimately its operators (shown in FIG. 1c).

FIG. 4 presents the RSSI measurements from transmissions intercepted by the Interceptor.

FIG. 18a is a photograph showing the point at which the siren was turned on, the route taken by the victim as the victim was being video streamed by a drone, and FIG. 18b is a photograph showing a spectrogram of the intercepted bitrate signal from a drone that was used by a malicious operator to spy on a person driving a car (a siren was turned on after 20 seconds of driving).

FIG. 19 shows graphs of extracted magnitudes around watermarked frequencies before and after a physical stimulus.

MODES FOR CARRYING OUT THE INVENTION

Figure 2A:
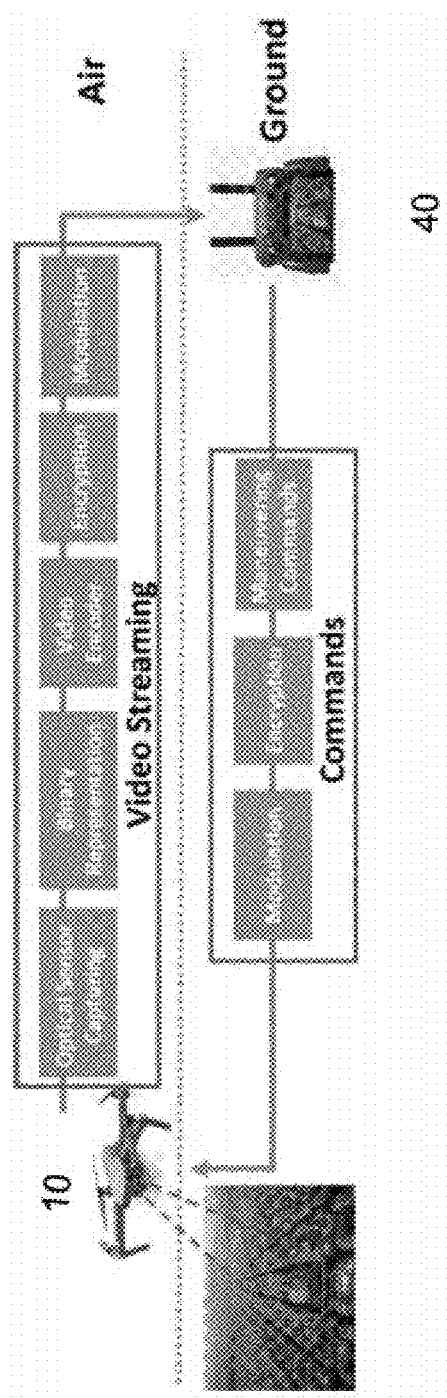
FIG. 2a is a block diagram of a Secured FPV channel scheme.
Figure 2B:
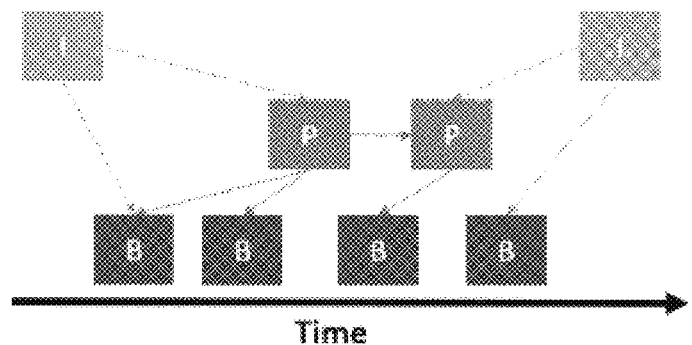
FIG. 2b is a diagram of a Group of Pictures (GOP) structure showing the I, B and P frames.

In the following detailed description of various embodiments, reference is made to the accompanying drawings that form a part thereof, and in which are shown by way of illustration specific embodiments in which the invention may be practiced. It is understood that other embodiments may be utilized, and structural changes may be made without departing from the scope of the present invention.

The present invention relates to a system and method of protecting a location or person (together referred to as Point of Interest (POI)) against an illegal, illegitimate or unwanted video streaming by a third party (referred to as a privacy attacker). The attack is typically carried out by a drone streaming live video back to its operator.

There are four parties involved in a privacy invasion attack perpetrated by drones: (1) a malicious operator that controls the drone (attacker); (2) a target (place, location, area, object) or victim (person); (3) an interceptor; and (4) a watermarker.

A malicious operator is any person or organization who uses a drone for the purpose of illegitimately video streaming a victim (person, place, object) for any reason. It is assumed that the malicious operator is using a Wi-Fi first-person view (FPV) drone and is typically activating the drone remotely (in 2018, commercial drones can be activated from a distance of up to 4 kilometers, and this distance is expected to increase as technology develops).

The target/victim can be any subject, building, object or facility that is of interest to a malicious operator and being illegitimately and/or illegally and/or undesirably video streamed by the drone.

The interceptor is an automated model of the invention (described in Algorithm 1) for detecting a privacy invasion attack. The interceptor can run on any hardware such as a PC/laptop/smartphone with a connected radio-frequency (RF) scanner (e.g., network interface card, software-defined radio) with an adequate antenna (for intercepting drone transmissions) and an amplifier.

The watermarker is a laptop/microcontroller (or any similar controller mechanism) that controls a device that can launch a periodic physical stimulus (preferably flickering) and turn it on and off according to a predefined pattern. In practical deployment, the victim/target may operate the watermarker permanently or choose to activate the physical stimulus (flickering) only when needed, e.g., when a drone is detected (based on the drone's RF transmission) and it is unclear whether the drone is being used to spy on the victim. Flickering can be launched using a variety of devices, including but not limited to LED strips, smart bulbs, a portable projector, smart film, and other devices that can be programmed to change their color and force pixel changes between consecutive frames.

The watermarker can be deployed inside or outside a target to be protected (house, facility, building, territory, car, ship etc.). The flickering device can use infrared lighting, which is helpful for at least two cases: the first when the watermarker is deployed inside a house or a car so it is invisible to people nearby and does not disturb them; the second when the target person (or facility security manager etc.) does not wish the drone operator to know that a flickering device is being used, and that the privacy attack is possibly identified.

In cases in which the watermarker is deployed outside the target area, there are occasions where there is no need to bring on an additional flickering device, when existing visible programmable lighting and its infrastructure can be used by the invention. One example of this involves the use of exterior building lights, commonly used these days for decoration in many buildings (residential, offices, government) and facilities (stadiums); often such existing lighting uses a changing lighting pattern which can be leveraged by the watermarker of the invention.

---

Algorithm 1: Detecting Privacy Invasion Attack

```
1:   procedure UnderDetection?
2:       enableMonitoringMode( )
3:       suspiciousNetworkList = getNetworksInRange( )
4:       for (network : suspiciousNetworkList) do
5:           if isFpvChannel(network) then
6:               // Draw stimulus frequency and duration
7:               fs = getRandomFloat(1,6)
8:               duration = getRandomFloat(1,10)*1000
9:               // Store stimulus beginning time
10:              time = currentTimeInMillis( )
11:              // Launch watermarker and determine spying
12:              watermarker(fs,duration)
13:              if isTargetFilmed?(network,fs,time) then
14:                  notifyVictim( )
```

---

Figure 3A:
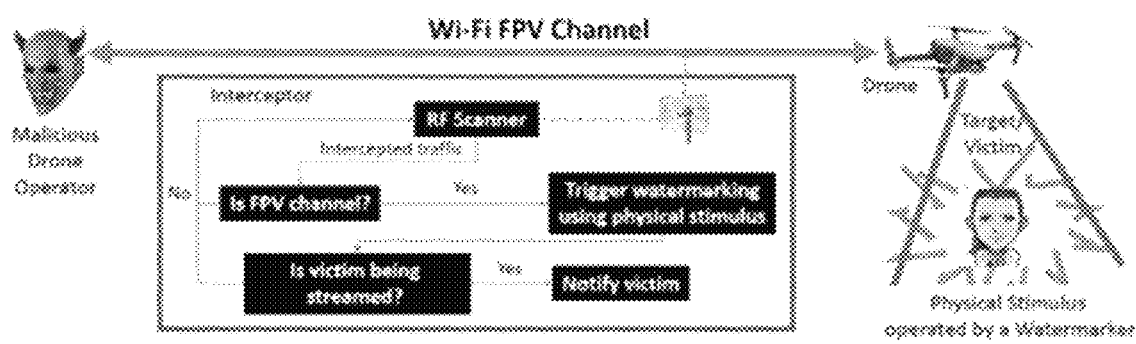
FIG. 3a is an FPV channel detection scheme.

FIG. 3a illustrates the proposed target detection scheme and the parties involved. The interceptor's model for detecting a privacy invasion attack is presented in Algorithm 1. First, suspicious transmissions are intercepted (line 3) and extracted to a suspiciousNetworkList. For each suspicious transmission network, the Boolean function isFpvChannel is applied to determine whether the network is an FPV channel (line 5). If the network is classified as an FPV channel, the algorithm triggers (if not active already) a periodic physical stimulus at a given frequency for a given duration (in milliseconds) by calling the method watermarker. Finally, the method isTargetFilmed? is called to determine whether the FPV channel network is being used to film the target/victim, and a notification is sent (to the victim or any other authority) upon detection of a privacy invasion attack (line 14).

Interception & Creating Bitrate Signal

The following experiments used four types of drones: two pure Wi-Fi FPV drones (DJI Spark and Parrot Bebop 2) and two drones which support Wi-Fi and analog FPV (DJI Mavic Pro and DJI Mavic Air). These drones were among the top 10 most sold drones in 2018. All of the drones' access points are secured by WPA 2, in order to guarantee that the transmitted video stream is only available for watching by the connected parties (controller).

Interception was applied as follows: using a laptop (Dell Latitude 7480) that runs Kali Linux with a standard NIC (Intel Dual Band Wireless-AC 8265 Wi-Fi) as the Wi-Fi receiver.

1) "Monitor mode" was enabled on the Wi-Fi receiver (used by the interceptor) using Airmon-ng.

2) Wi-Fi networks were detected within the range of the Wi-Fi receiver used.

3) A Wi-Fi sniffer (Airodump-ng) was used to intercept packets of a specific Wi-Fi network.

This process is considered as external interception, i.e., a specific network's transmissions are intercepted without connecting to the network. By intercepting packets this way, it is not possible to observe encrypted layers of captured packets (because the required decryption key is unknown). The interception range can be extended to detect transmissions from drones up to a few kilometers from the victim using additional hardware such as a dedicated antenna or amplifier.

The process of creating an intercepted bitrate signal from the captured packets is as follows:

4) From each captured packet, the following information is extracted: (a) Packet's arrival time in nanoseconds—information added to each captured packet by Airodump-ng; and (b) Packet's size—information that was extracted from the unencrypted meta-data (PLCP header) from the data link layer.

5) Finally, the signal's resolution is changed from nanoseconds to milliseconds by aggregating all packets captured in each millisecond.

Figure 3B:
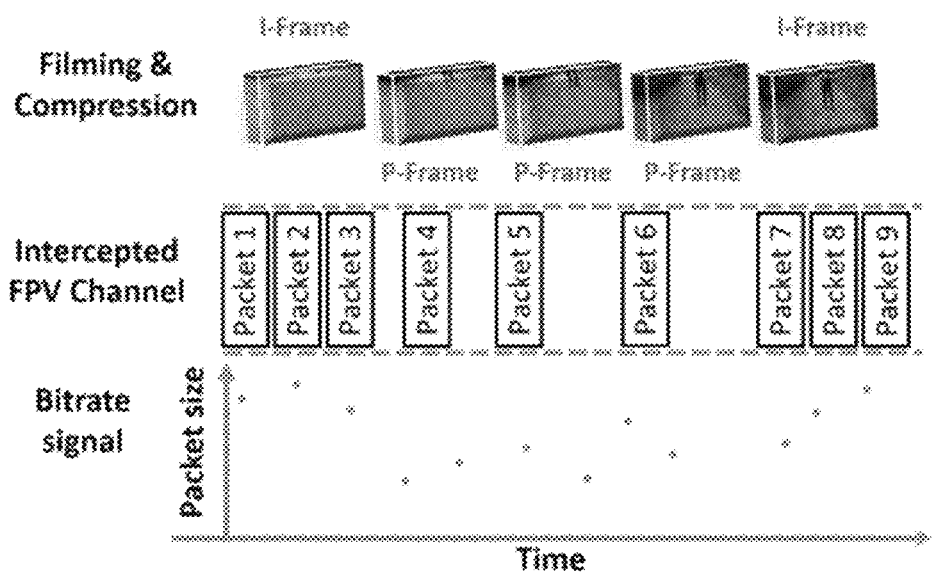
FIG. 3b shows the creation of a Bitrate signal using interception.

The two bash (Unix shell) scripts that implement stages 1-3 and 4-5 are presented in Appendix I. The output of this process is referred herein as the intercepted bitrate signal. The FFT graphs and spectrograms (power spectral density) in the figures were extracted from the intercepted bitrate signal. FIG. 3b depicts this process.

Detecting FPV Channel

When a suspicious transmission is identified, it first needs to be classified as an FPV channel and then it is necessary to extract details about its quality. The present invention relates to an improved passive radar method that relies on two detection stages: (1) moving object detection, and (2) video channel detection. Two additional benefits from using the method of the invention are that unlike similar passive radar methods, the method of the invention can distinguish between a drone and other moving Internet of Things (IoT) devices, and in addition enables extracting the FPV channel quality (FPS and resolution) as well.

Detecting Moving Objects—Known passive radar methods for classifying an intercepted transmission as an FPV channel analyze RSSI (received signal strength indicator) measurements that are added by a static radio receiver (e.g., NIC, SDR, etc.) in order to detect a moving drone. The classification is based on unique RSSI patterns that are the result of a drone's movement. However, these methods do not differentiate a drone from other ubiquitous moving IoT devices that transmit radio signals such as robotic vacuum cleaners, smartwatches, smartphones, etc. A drone's RSSI behavior can be similar to other moving IoT devices and thus moving object detection alone is not sufficient for distinguishing a drone from other moving IoT devices.

1) Experimental Setup: In one experiment, a laptop was placed on the ground and used as passive radar. A person walked a distance of 25 meters from the laptop for 100 seconds (at a very slow speed) with a smartphone (Samsung Galaxy S8) in his pocket and a smartwatch (LG smartwatch Urbane $2^{nd}$ Edition) on his wrist. After 100 seconds, he returned to the laptop on the same path. A drone (DJI Mavic Pro) was flown at an altitude of two meters from the ground, along the same path (the operator stood near the laptop). The traffic sent by the smartwatch, smartphone, and drone via the laptop was intercepted (as described in "Interception & creating bitrate signal").

Figure 4A:
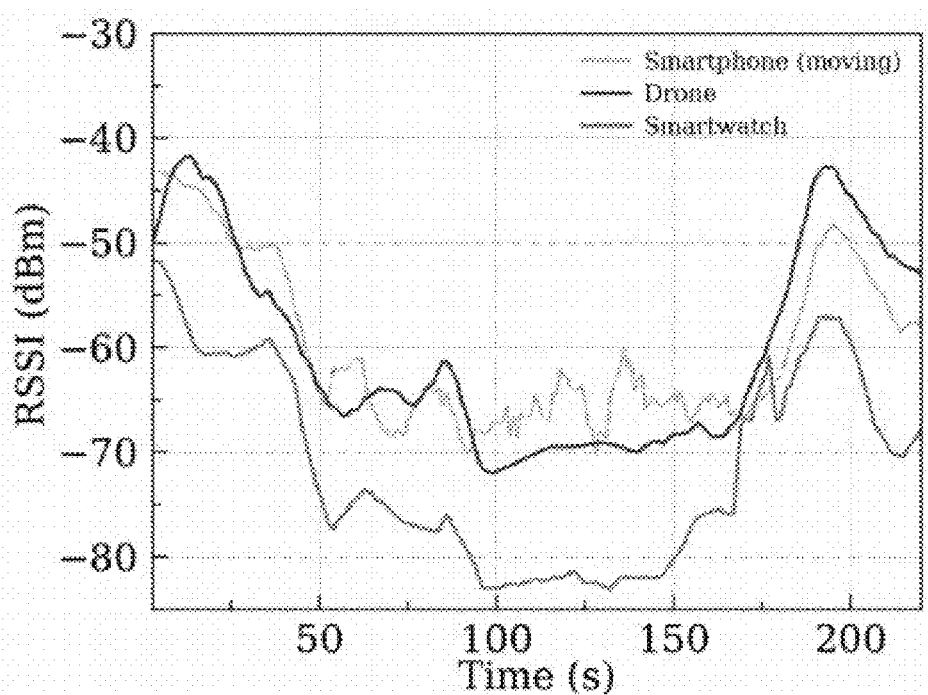
FIG. 4a shows similar RSSI patterns obtained from a smartwatch, a smartphone, and a drone.

1) Results: FIG. 4a presents the RSSI measurements from transmissions sent from the drone, smartwatch, and smartphone as they were captured by the laptop using external interception. As can be seen from the results, the RSSI measurements and patterns are similar for the smartphone, smartwatch, and drone. This experiment proves that relying on moving object detection methods alone as a means of classifying an FPV channel using RSSI analysis is not enough and it requires an additional stage to filter out moving IoT devices that are not drones.

Detecting Video Stream & Extracting its Quality—A new method is disclosed for classifying an intercepted transmission as a video stream that can extract details about the video stream's quality (FPS and resolution).

1) Experimental Setup: The following experiment was conducted using the Bebop Parrot 2 drone which supports three FPV transmission rates (24, 25, and 30 FPS). The drone was positioned on the ground and its application was used to change the FPS rate every two minutes (from 24 FPS to 25 FPS and then from 25 FPS to 30 FPS). The traffic that was sent from the drone was intercepted and the intercepted bitrate signal was created (as described in "Interception & creating bitrate signal").

Figure 4B:
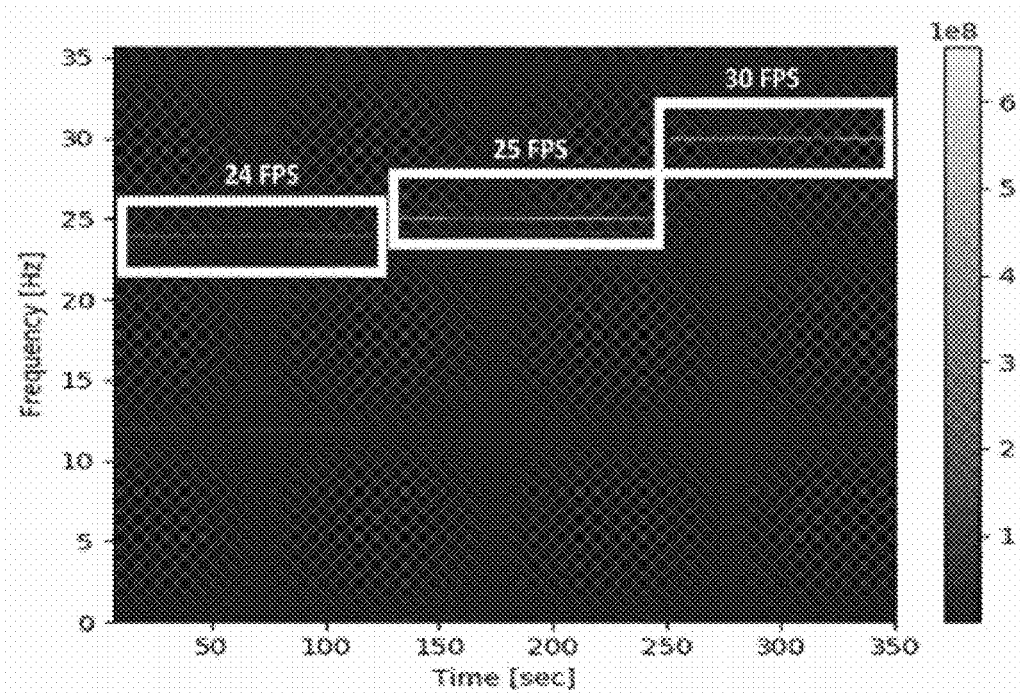
FIG. 4b shows a spectrogram (power spectral density) of the intercepted bitrate signal of a drone access point when the FPS was changed.

2) Results: As can be seen from the spectrogram extracted from the intercepted bitrate signal in FIG. 4b, the power around each of the FPV transmission frequencies (FPSs) outperforms any other frequency. Video streams can be detected by comparing the frequency with the strongest magnitude of the intercepted bitrate signal to known FPS rates used by video streams. By detecting the FPS of a captured video stream, it is also possible to use the intercepted bitrate signal to infer the resolution of the video stream, and find the resolution for the H-264 standard video.

Classifying FPV Channels—Algorithm 2 presents a method for classifying FPV channels based on the observations mentioned above. It receives a suspicious intercepted network, and classifies the network as an FPV channel if a connected media access control (MAC) address was found to be a moving object (line 5) that transmits traffic at known drone FPS video rates (line 10). In prior research, methods to classify an IoT device as a moving object based on RSSI analysis have been applied to detect moving smartphones and smartwatches. The distance between a moving radio transmitter and a static receiver can be derived from RSSI measurements, and this has been used for indoor localization of smartphone users.

---
Algorithm 2: Classifying an FPV Channel
---

```
1:   procedure IsFpvChannel?(network,time)
2:       frequency = 70
3:       for (macAddress : network) do
4:           //Detecting Moving Objects
5:           if (isMovingObject(macAddress)) then
6:               bitrate[ ] = extractBitrateSignal(macAddress)
7:               fft [ ] = FFT(bitrateArray,frequency)
8:               index = frequencyWithStrongestMagnitude(fft)
9:               //Detecting video channel
10:              if (index==24 || index==25 || index==30) then
11:                  return true
12:      return false
```

1) *Experimental Setup:* the objective was to evaluate the performance of Algorithm 2 given a device that was already found to be a moving object; therefore, it is important to determine how much time it takes to classify a moving object as a drone. In order to accomplish this, in this experiment 1000 seconds of traffic were intercepted (as described in "Interception & creating bitrate signal") from the Bebop Parrot 2 and DJI Spark drone (500 seconds from each drone) while they flew in the air (at an altitude of 30 meters). 1000 seconds of traffic were also intercepted from moving IoT devices as follows: 290 seconds from a robotic vacuum cleaner (Roborock S50) as it was performing routine home cleaning, 290 seconds of traffic from a smartwatch (LG G W150), and 420 seconds of traffic from a smartphone (OnePlus 5). The smartwatch was worn on the wrist of a person walking with a smartphone in his pocket.

Figure 4C:
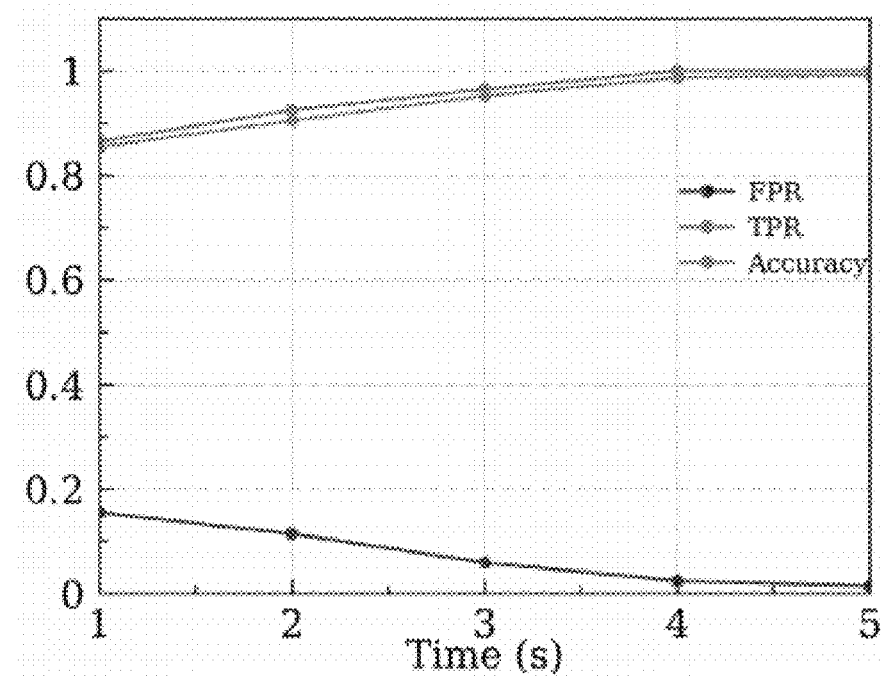
FIG. 4c shows classification results of Algorithm 2.

2) *Results:* The intercepted bitrate signals was obtained for each of the devices and then the intercepted signals were divided into smaller signals (each signal was five seconds long). This process resulted in 200 intercepted bitrate signals obtained from drones and 200 intercepted bitrate signals obtained from other moving IoT devices. FIG. 4c presents the results (accuracy, TPR, and FPR) after applying Algorithm 2 on the data with various interception windows (1-5 seconds). As can be seen in FIG. 4c, once a device has been identified as a moving object it takes just four seconds to classify its transmissions as an FPV channel. After four seconds, accuracy of 0.99 and a true positive rate (i.e., drone detection rate) of 1.0 is obtained. The confusion matrices from this experiment are presented in the following Table I:

Table I presents confusion matrices resulting from the application of Algorithm 2 with various interception windows on the following moving IoT devices: drone, smartwatch, smartphone, and robotic vacuum cleaner.

Watermarking FPV Channel

The influence of a periodic physical stimulus which is applied to a target/victim that is being streamed by a drone, can be assessed by analyzing the intercepted bitrate signal. The algorithm that controls the periodic physical stimulus is referred herein as a "watermarker" (described in Algorithm 3).

---
Algorithm 3: Physical Watermarking
---

1:   procedure WATERMARKER(frequency,duration)

2:   $$onOffDuration = \frac{1000}{2*frequency}, N = \frac{duration}{onOffDuration}$$

```
3:       for (i = 0; i < N; i++) do
4:           if (i%2 == 0) then
5:               turnOnPhysicalStimulus( )
6:           else turnOffPhysicalStimulus( )
7:           sleep(onOffDuration)
8:       turnOffPhysicalStimulus( )
```

Algorithm 3, which runs from a computer/controller, controls a device that creates a periodic stimulus (e.g., flickering) whose frequency can be controlled and programmed in advance. The algorithm receives two parameters: frequency (amount of stimuli per second) and duration (typically in milliseconds). The algorithm creates a square wave at the given frequency, and based on this, turns a physical stimulus on and off for the specified duration. The periodic stimulus can also be other measures other than light, for example, a ventilator whose blade speed can be controlled, car windshield wipers etc.

Figure 5:
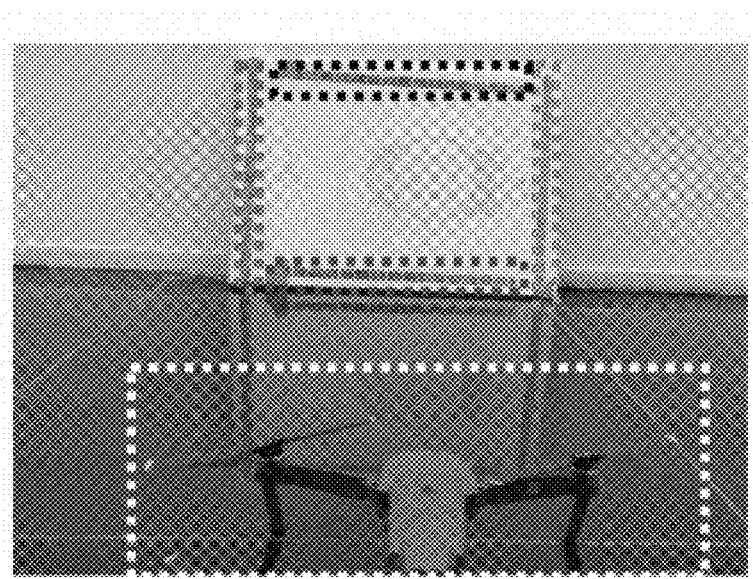
FIG. 5 shows an Experimental setup—drone (framed in white) located in front of a white board with four LED strips (framed in red, green, purple, and black).

1) *Experimental Setup:* Four LED strips were attached, each of which was connected to a microcontroller, to a white board (as can be seen in FIG. 5) and performed the following experiment. The microcontroller that was connected to the top LED strip (framed by black dots in FIG. 5) was programmed so that it would flicker at various frequencies (0.5, 1, 1.5, 2, 2.5, 3, 3.5, 4, 4.5 Hz) for one minute per frequency. A DJI Mavic Pro consumer drone was positioned in front of the board at a distance of 1.5 meters (as can be seen in FIG. 5), intercepted the traffic sent from the drone, and created the intercepted bitrate signal (as described in "Interception & creating bitrate signal").

Figure 6:
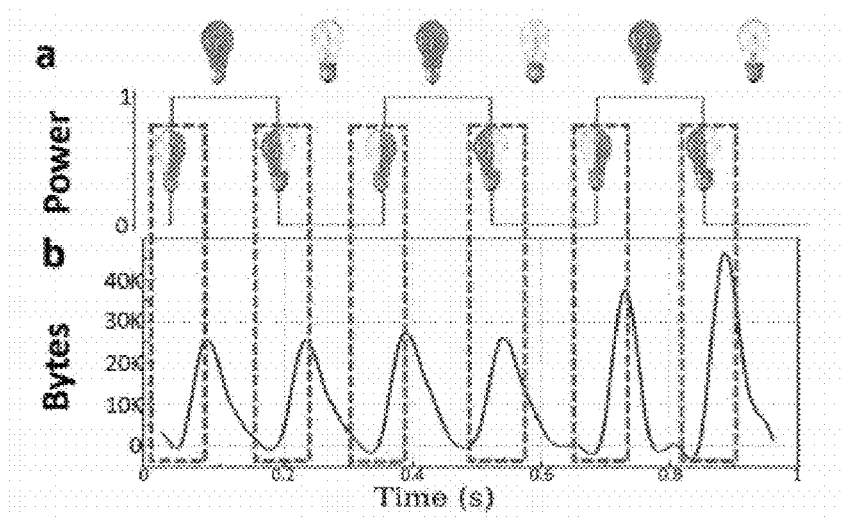
FIG. 6 is a graph showing the influence of flickering: (a) a bulb according to a 3 Hz square wave, (b) six bursts from one second of the intercepted bitrate signal of a drone that streams a 3 Hz flickering LED strip.

2) *Results:* FIG. 6b presents one second from the intercepted bitrate signal that was captured during the time that

TABLE I

Figure 7:
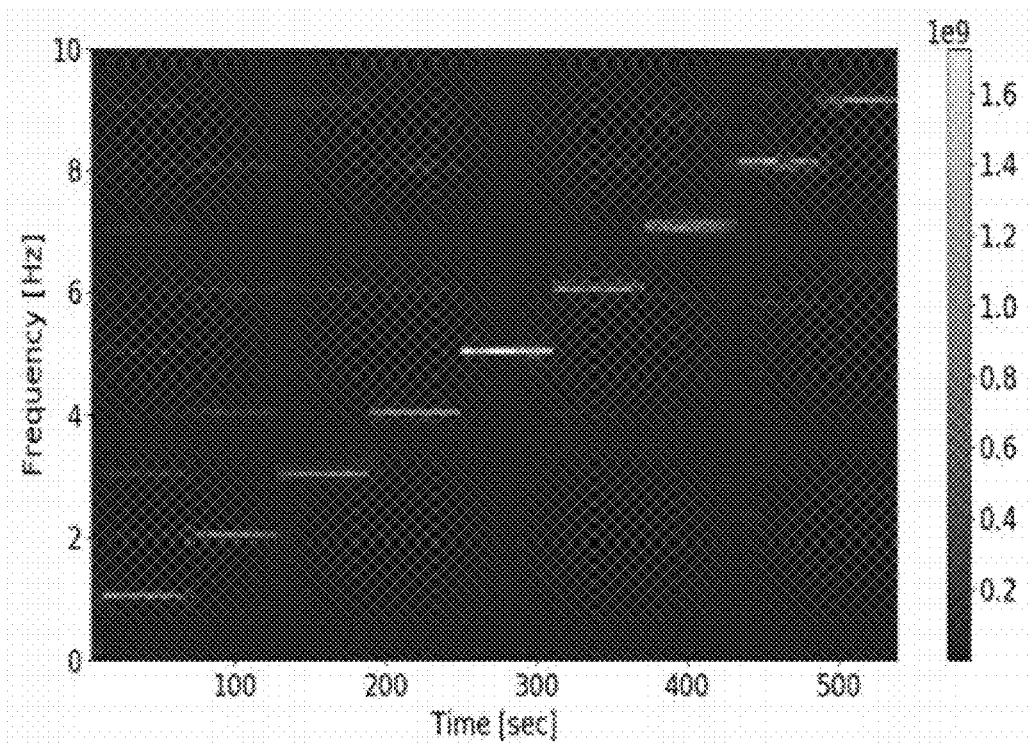
FIG. 7 is a spectrogram (power spectral density) of the intercepted bitrate signal of a drone located in front of an LED strip that flickers for one minute at frequencies of 0.5, 1, 1.5, 2, 2.5, 3, 3.5, 4, 4.5 Hz.

| | | Classification results based on various interception periods | | | | | | | | |
|---|---|---|---|---|---|---|---|---|---|---|
| | | Actual Interception Period | | | | | | | | |
| | | 1 second | | 2 seconds | | 3 seconds | | 4 seconds | | 5 seconds |
| | | Predicted/Actual Moving IoT Device | | | | | | | | |
| | | Drone | Others | Drone | Others | Drone | Others | Drone | Others | Drone | Others |
| Predict | Drone | 173 | 31 | 185 | 23 | 193 | 12 | 200 | 5 | 200 | 3 |
| | Other Moving IoT Devices | 27 | 169 | 15 | 177 | 7 | 188 | 0 | 195 | 0 | 197 | the top LED strip flickered at 3 Hz, as can be seen in FIG. 6a. As can be seen from FIGS. 6a and 6b, a 3 Hz flickering LED strip creates a 6 Hz phenomena within the intercepted bitrate signal by producing six bursts per second. Each time the LED strip was turned on/off a larger amount of data was sent from the drone which is expressed as a burst of bytes in the time domain. This is due to the fact that a larger number of P-frames was required to encode the changing macroblocks (changing pixels) compared to an unchanging video stream. FIG. 7 presents a spectrogram that was produced from the intercepted bitrate signal of the entire experiment. As can be seen, frequencies of 1-9 Hz were influenced by this experiment. The flickering LED watermarks the frequency of the intercepted bitrate array exactly at the point which is twice its flickering frequency. It can be concluded that the flickering object's frequency can be detected using this method by analyzing FPV traffic, and moreover, that it can even be used as a means of detecting whether the drone's camera is being used to stream a flickering object when the channel is encrypted. However, since the slowest FPS rate among the four drones supports just 24 FPS, the maximum frequency of a flicker that can be detected by analyzing the intercepted bitrate signal is limited to a 6 Hz flickering rate that watermarks the 12 Hz frequency of the intercepted bitrate array (Nyquist frequency). The ratio between the magnitude after a flicker was triggered (noise) and the magnitude before a flicker was triggered (signal) around the influenced frequency is referred to as the signal to noise ratio (SNR).

Locating Drone in Space

First, it is necessary to calculate the distance and angle between the watermarker and the drone. Then, it is possible to leverage these findings to create a drone locating model and evaluate its performance.

Detecting Drone's Distance—1) Influence of Distance on SNR: The following experiment shows the influence of distance on a fixed sized flickering object. Experimental Setup: A portable projector was aimed at the exterior wall of a building; the projector was used to project a video of a flicker (3.5 Hz) onto a specific portion of the wall (a rectangle 2.5×2.5 meters in size). A DJI Mavic Pro was flown various distances (10 m, 20 m, . . . , 90 m, 100 m) from the flickering rectangle. As in real surveillance, the drone's camera was zoomed (2×) on the flickering rectangle (that was considered as the target in this experiment). A laptop was placed near the projector to intercept the traffic sent from the drone during the experiment.

Figure 8:
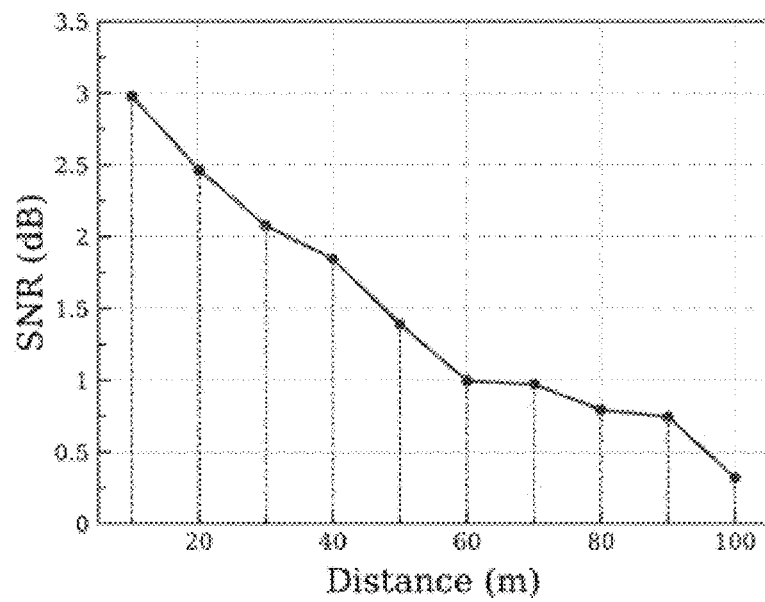
FIG. 8 is a graph of the SNR—magnitudes around 7 Hz as a function of the distance between a drone and a flickering object.

Results: FIG. 8 presents the SNR as a function of distance. As can be seen, using a rectangle of 2.5×2.5 meters leaves a watermark with an SNR that is greater than one from a distance of 50 meters. Since the number of pixels that are changed as a result of a flickering object is greater from a shorter distance, many more macroblocks are changed (as a result of the flickering) and the SNR is greater; in contrast, greater distances cause the flickering object to be smaller and result in changing fewer macroblocks and a lower SNR. However, the new DJI Mavic 2 Zoom supports 4× zoom, which has twice the zoom capacity of the drone that was used for this experiment. The DJI Mavic 2 Zoom can be detected from a greater distance, because a fixed size object that is captured by a drone with 2× zoom from a distance of 50 meters can be captured by a drone with 4× zoom from a distance of 100 meters.

2) Extracting Drone's Distance: The objective was to extract the distance between the drone and the flickering object. In order to do so, it was necessary to first learn the effect of changing the percentage of captured pixels on the traffic.

Experimental Setup: The DJI Mavic Pro (configured to 24 FPS and 720p) was placed in front of a laptop monitor located 0.5 meters away. 11 experiments were conducted using this setup, and in each experiment a flickering rectangle (at 3 Hz) of a different size was presented in the middle of the monitor (10%, 20%, . . . , 90%, 100%). In each experiment, traffic (as described in "Interception & creating bitrate signal") sent from the drone was intercepted. The 11 intercepted bitrate signals were obtained, and FFT was applied to each of them.

Figure 9:
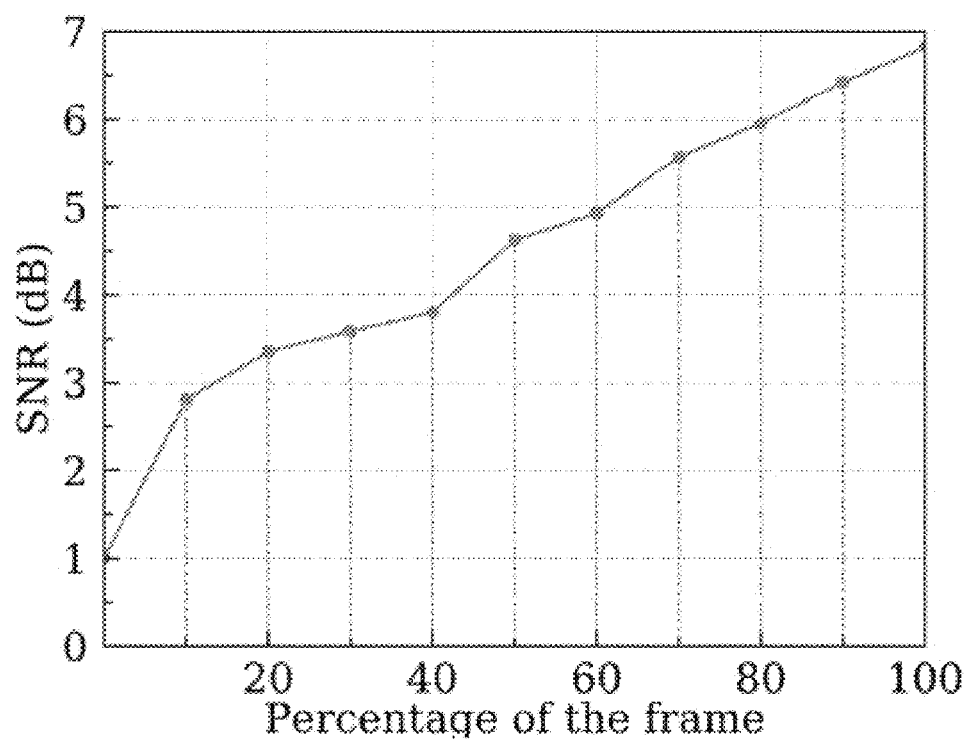
FIG. 9 is a graph of the SNR—magnitudes around 6 Hz as a function of the percentage of changing pixels.

Results: As can be seen in FIG. 9, the SNR that was computed from the magnitudes around 6 Hz in the experiments, the SNR increases as a function of the percentage of changing pixels. By increasing the size of the rectangle, the number of macroblocks that were changed between consecutive frames also increased. Encoding a larger number of macroblocks increases the bitrate which improves the SNR. Based on the results of the experiments, the performance of four regression methods (polynomial, linear, exponential, and logarithmic) was compared to predict the percentage of changing pixels given a specific magnitude.

TABLE II

Error of distance prediction based on regression methods

| Method | RSS | $R^2$ |
|---|---|---|
| Polynomial Regression | 56 | 0.994 |
| Linear Regression | 464 | 0.957 |
| Exponential Regression | 581 | 0.947 |
| Logarithmic Regression | 2523 | 0.770 |

Table II presents the residual sum of squares (RSS) and coefficient of determination (R2) of the percentage of changing pixel prediction for each regression method. The function of the polynomial regression that yielded the best prediction result among the tested methods is presented in Equation 1:

$$\% \text{ Changing Pixels}(SNR=s) = 1.12 - 3.14 \times 10^{-7} s^4 + 6.96 \times 10^{-5} s^3 - 5.12 \times 10^{-3} s^2 + 1.87 \times 10^{-1} s \quad (1)$$

By applying a physical stimulus using a square shaped flicker at a specific frequency, the interceptor can calculate the height and width of the flickering object (in terms of pixels) in a frame (picture) by applying the following steps:
1) Determining the FPV resolution of the FPV channel (as explained in "Detecting FPV Channel").
2) Triggering a physical stimulus using a square flickering at a specific frequency (e.g., 3 Hz).
3) Calculating the percentage of changing pixels from the intercepted bitrate signal using Equation 1.
4) Inferring the amount of changingpixels from the FPV resolution.
5) Inferring the height and width (in terms of pixels) of the flickering object in a frame.

For a square flickering object, it can be concluded that the:

$$\text{height(in pixels)} = \text{width(in pixels)} = \sqrt{\%\text{ChangingPixels}(m) \times \text{FPVResolution}} \quad (2)$$

By calculating the height and width (in pixels) of a flickering object (for which the real size is known), the interceptor can infer the distance between the drone's camera to the flickering object from the intercepted FPV channel (for which the resolution was also determined) using Equation 3:

$$\text{Distance (mm)} = \text{factor}(p) \times \text{factor}(d) \quad (3)$$

factor(p) is defined as follows (Equation 4):

$$\text{factor}(p) = \frac{realObjectHeight(\text{mm}) \times imageHeight(\text{pixels})}{objectHeight(\text{pixels})} \quad (4)$$

The parameters required to calculate factor(p) have already been calculated. factor(d) is drone dependent and defined as follows (Equation 5):

$$\text{factor}(d) = \frac{f(\text{mm})}{sensorHeight(\text{mm})} \quad (5)$$

The parameters f(mm) and sensorHeight(mm) are published online in the specifications for each of the drones [www.dji.com/mavic], [www.dji.com/mavic-air/info#specs], [www.dji.com/spark/info#specs]. The sensorHeight(mm) for each drone is 1/2.3" (11.0434783 millimeters). The lens' length of each drone varies between 24 and 35 mm, so factor(d) is in the range of (Equation 6):

$$0.31 < \text{factor}(d) < 0.46 \quad (6)$$

Based on Equations 6 and 3, it can be seen that the distance between the drone and the flickering object varied in the range of (Equation 7):

$$0.31 \times \text{factor}(p) < \text{Distance (mm)} < 0.46 \times \text{factor}(p) \quad (7)$$

For factor(d)=0.385, a maximum error of 0.075×factor(p) is obtained for the distance estimation. If the exact type of drone can be detected from the intercepted FPV channel (e.g., according to a unique FPS rate), the computed distance is accurate.

Detecting Drone's Angle

Next, the effect of the angle between the flickering object and the drone is described.

1) Experimental Setup: Using the white board presented in FIG. 5, the microcontrollers of the LED strip on the left were programmed to flicker at 3 Hz and those of the LED strip on the right to flicker at 3.5 Hz simultaneously. The drone was positioned at 17 different angles (10, 20, . . . , 160, 170). The distance between the drone and the middle of the strips was the same for each of the 17 positions. The traffic sent from the drone was intercepted and created the intercepted bitrate signal (as described in "Interception & creating bitrate signal").

Figure 10:
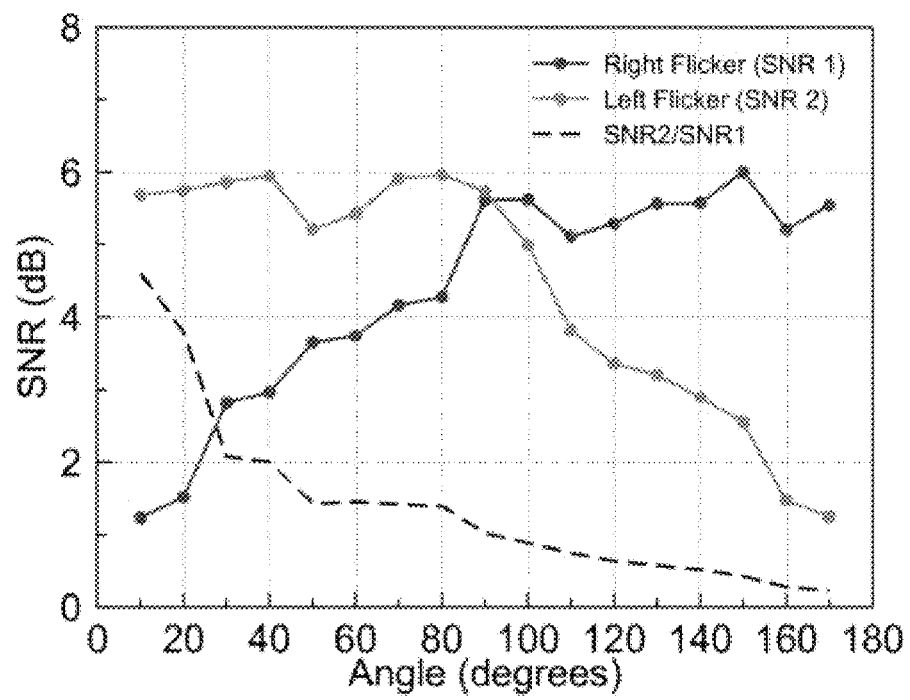
FIG. 10 is a graph of the SNR—magnitudes around 7 Hz (SNR1) and 6 Hz (SNR2) as a function of the angle at the midpoint between two flickering LED strips.

2) Results: The SNR around the frequencies of 7 Hz (referred to as SNR1, i.e., the SNR around the frequency that is influenced by the left flickering LED) and 6 Hz (referred to as SNR2, i.e., the SNR around the frequency that is influenced by the right flickering LED) is presented in FIG. 10. As can be seen, the SNR at those frequencies behaves as a mirror around 90 (due to the fact that flickering objects of the same size have the same effect). However, the magnitude of the LED strip that was far from the camera when the drone was located diagonal to the white board decreases, since a flickering object that is farther away is smaller compared to a flickering object that is closer. The ratio between SNR2 and SNR1 (SNR2/SNR1) is also presented in FIG. 10. As can be seen, the ratio decreases as the angle increases. Compared. The performance of four regression methods (polynomial, linear, exponential, and logarithmic) was compared to predict the angle between the drone and the middle of the two LED strips, based on the ratio between SNR2 and SNR1. Table II presents the residual sum of squares (RSS) and coefficient of determination ($R^2$) of angle prediction for each regression method. The function obtained based on exponential regression is presented in Equation 8:

TABLE II

Error of angle prediction based on regression methods

| Method | RSS | $R^2$ |
|---|---|---|
| Exponential Regression | 979 | 0.976 |
| Polynomial Regression | 1062 | 0.973 |
| Logarithmic Regression | 1450 | 0.964 |
| Linear Regression | 10011 | 0.754 |

$$\text{Angle}(SNR1, SNR2) = 192.72 * e^{-0.71 * \frac{SNR2}{SNR1}} \quad (8)$$

Locating Drone's Location

Figure 11:
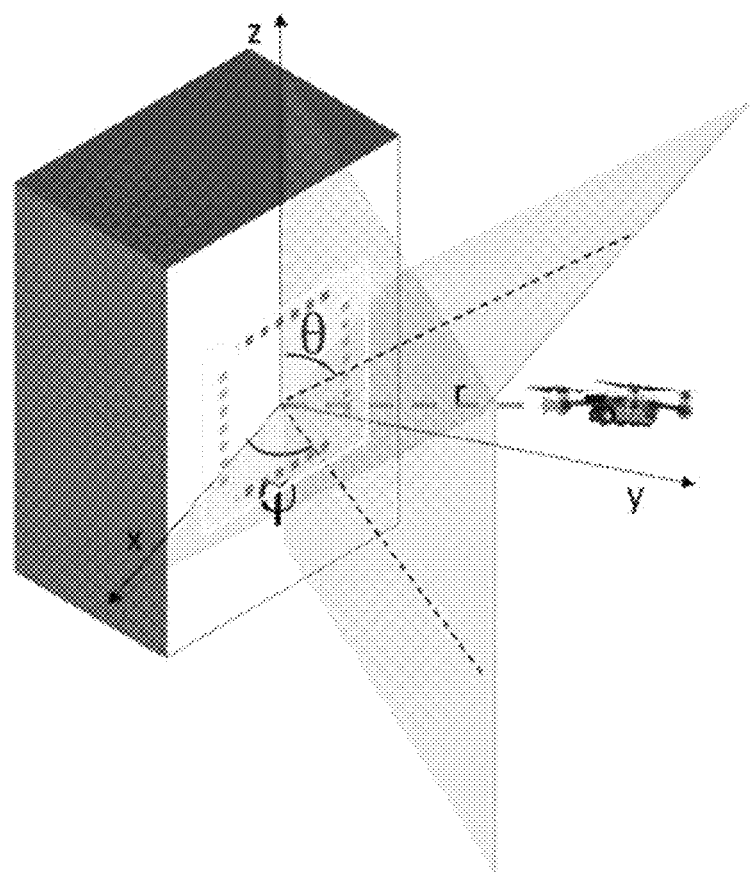
FIG. 11 illustrates Locating a drone based on four flickering LED strips that creates r, $\theta$, and, $\phi$.

Having a formula to detect the distance r between a drone and a flickering object and a formula to detect the angle of a planner that spreads from a drone to the middle of two parallel flickering objects attached to a white board, FIG. 11 leverages these findings for locating a drone in space using a white board (framed in yellow) with two pairs of parallel flickering objects. As can be seen in the figure, the objects that comprise the first pair of parallel flickering objects (marked with red dots) are located at the top and bottom of a rectangle board (framed in yellow) and spread a red planner with angle φ along the x-axis. The objects comprising the second pair of parallel flickering objects (marked with green dots) are located on the left and right sides of the same board (framed in yellow), and they spread a green planner with angle φ along the z-axis. We consider (r, θ, φ) spherical coordinates that give the relative location of a drone from a rectangle board that contains two pairs of parallel flickering LED strips. The Cartesian coordinates (x,y,z) can be retrieved from the spherical coordinates (r, θ, φ) using known formulas [https://en.wikipedia.org/wild/Spherical_coordinate_system.].

Figure 12:
FIG. 12 shows a board with four flickering LED strips installed on a balcony.
Figure 14:
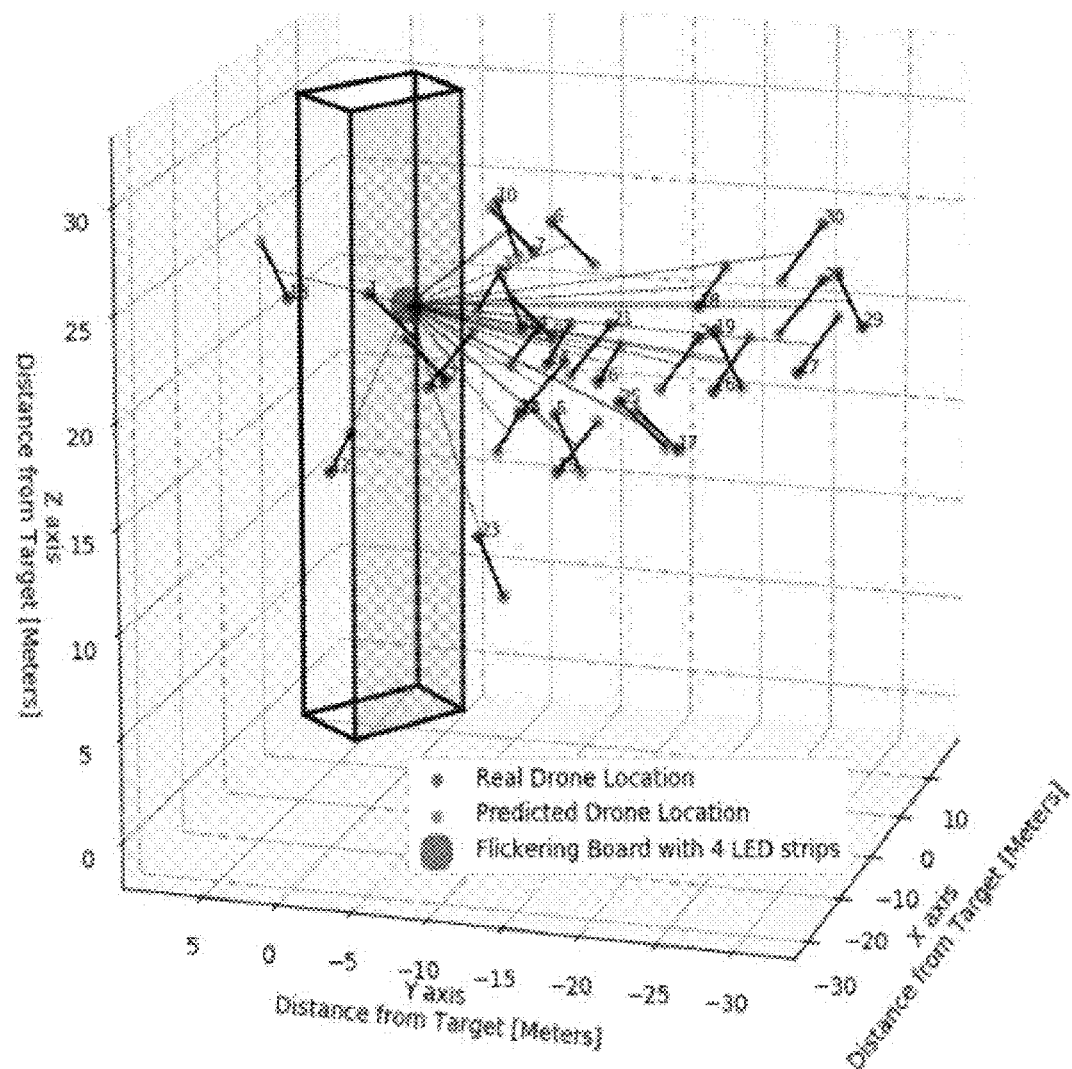
FIG. 14 is a graph showing results of the locating a drone in space experiment when applying a physical stimulus for two seconds.

1) Experimental Setup: In order to evaluate the accuracy of a mechanism for locating a spying drone in space according to the formulas, the following experiment was conducted. The white board presented in FIG. 5, which has an LED strip connected to a microcontroller on each edge, was attached to a balcony located on the third floor of a building (21 meters from the ground) so that the side of the board with the LED strips was facing outward, as can be seen in FIG. 12. The DJI Mavic Pro drone was flown between 30 different locations at various altitudes and distances from the balcony while the drone conducted a privacy invasion attack against the organization (i.e., the drone's video camera streamed the balcony). The exact 30 locations, as measured by the DJIGo application (longitude, latitude, and altitude), are listed in Appendix II and marked by blue dots in FIG. 14. Each of the four LED strips was programmed to flicker at a different frequency for 30 seconds. The drone's FPV channel was intercepted at each of the 30 locations and extracted 30 bitrate signals.

Figure 13:
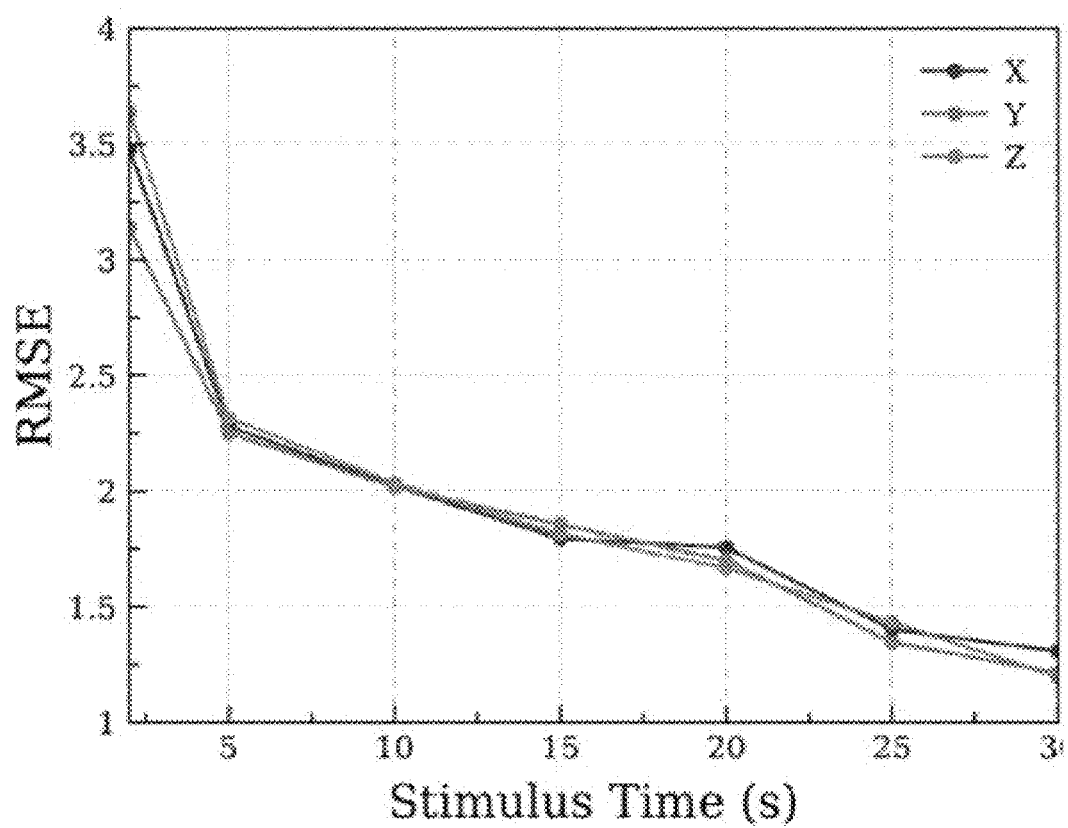
FIG. 13 is a graph showing the root mean square error (RMSE) results of the locating drone experiment as a function of the amount of time that flickering was applied.

2) Results: Using the previously mentioned formulas, the spherical coordinates (r, θ, φ) were computed for each of the locations and computed the Cartesian coordinates (x,y,z)

from the spherical coordinates according to [https://en.wikipedia.org/wiki/Spherical_coordinate_system]. Based on the computed Cartesian coordinates, the GPS coordinates (latitude, longitude) and altitude were calculated. Finally, the error between the actual location and the predicated location was computed. FIG. 13 presents the mean square error (RMSE) results for the x, y, and z-axes as a function of the amount of time the physical stimulus was applied. As can be seen, the accuracy along each axis is improved from an average error of 3.5 meters (by applying flickering for two seconds) to an average error of 1.2 meters (by applying flickering for 30 seconds). The actual locations and predicted locations (by applying two seconds of flickering) are presented in FIG. 14 and Appendix II. Considering the fact that the measurements of the 30 real locations were obtained from the drone's GPS (using its application) and the known average error of GPS devices (a 4.9 meter radius in the open sky, it is possible to accurately locate a spying drone in space using four flickering LED strips and a single Wi-Fi receiver by applying flickering for two seconds.

Hiding the Physical Stimulus

Figure 15A:
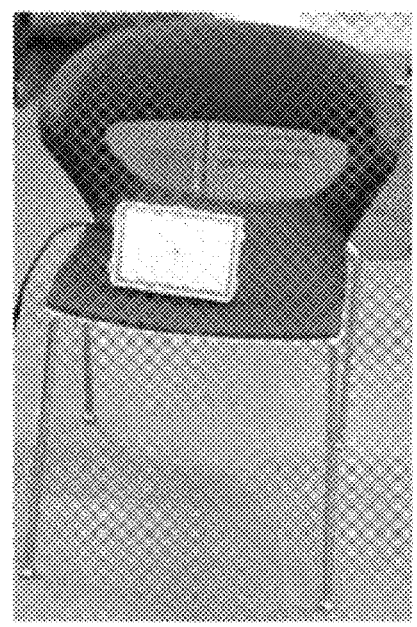
FIG. 15a is a picture of an infrared LED projector captured by the DJI Mavic.

In some embodiments, a physical stimulus can be produced in such a way that it is undetectable to the human eye. Preferably, an undetectable physical stimulus should fulfill the following three requirements: (1) it should be undetectable by direct observation by the drone's operator via the naked eye, (2) it should be undetectable by indirect observation by the drone's operator via the controller screen, and (3) it should watermark the FPV channel. The human eye has a limited ability to capture infrared and UV frequencies. The influence of using infrared LEDs as a means of creating a physical stimulus was tested. As can be seen in FIG. 15a, the drone's camera is sensitive to infrared frequencies and can capture them; therefore, this method does not meet the second requirement. However, infrared flickering can be used in cases in which the watermarker is deployed inside a house/car, and there is no need to hide the flickering from the drone's operator in order to create invisible flickering that will not disturb the people in the house/car.

1) Experimental Setup: Another method was tested that takes advantage of a different limitation of the human eye: its inability to distinguish between two almost identical hues of the same color. In this experiment the objective was to determine whether a physical stimulus that both flickers between two similar hues (with different RGB values) and is undetectable to the human eye can be produced and leave a noticeable (distinguishing) effect on the FPV channel.

TABLE IV

YUV and RGB values used in the experiments

| Luma (Δ) | YUV | RGB |
|---|---|---|
| Baseline | 231, 26, 143 | 253, 255, 51 |
| 1 | 230, 26, 143 | 252, 254, 50 |
| 2 | 229, 26, 143 | 251, 253, 49 |
| 3 | 228, 26, 143 | 250, 252, 48 |
| 4 | 227, 26, 143 | 249, 251, 47 |
| 5 | 226, 26, 143 | 248, 250, 46 |

Two experiments were conducted. In the first experiment, a random RGB color (253, 255, 51) was picked as the baseline and transformed to the YUV color space (231, 26, 143). Five new hues similar to the baseline color were created by reducing the luma component (as shown in Table IV). The DJI Mavic Pro was placed in front of, and 0.5 meters away from, a smart LED bulb (Magic Blue) that provides the BLE protocol for controlling. The Magic Blue was programmed to flicker between two similar hues as follows: For the first minute, the Magic Blue was set at the baseline color (231, 26, 143). For the second minute, the Magic Blue was set to flicker at 2.3 Hz between the baseline color and the color that we created by reducing the luma component by one (230, 26, 143). For the third minute, the Magic Blue was set to flicker at the same frequency between the baseline color and the color that we created by reducing the luma component by two (229, 26, 143). This pattern continued until the flickering included the last color that we created (226, 26, 143). In the second experiment, the DJI Mavic Pro was positioned at various distances (3 m, 6 m, 10 m, 15 m, 20 m, 25 m, 30 m) from the Magic Blue bulb that was programmed to flicker between two similar hues: (231, 26, 143) and (226, 26, 143). In both experiments, the traffic sent from the drone was intercepted and the intercepted bitrate signal was extracted.

Figure 15B:
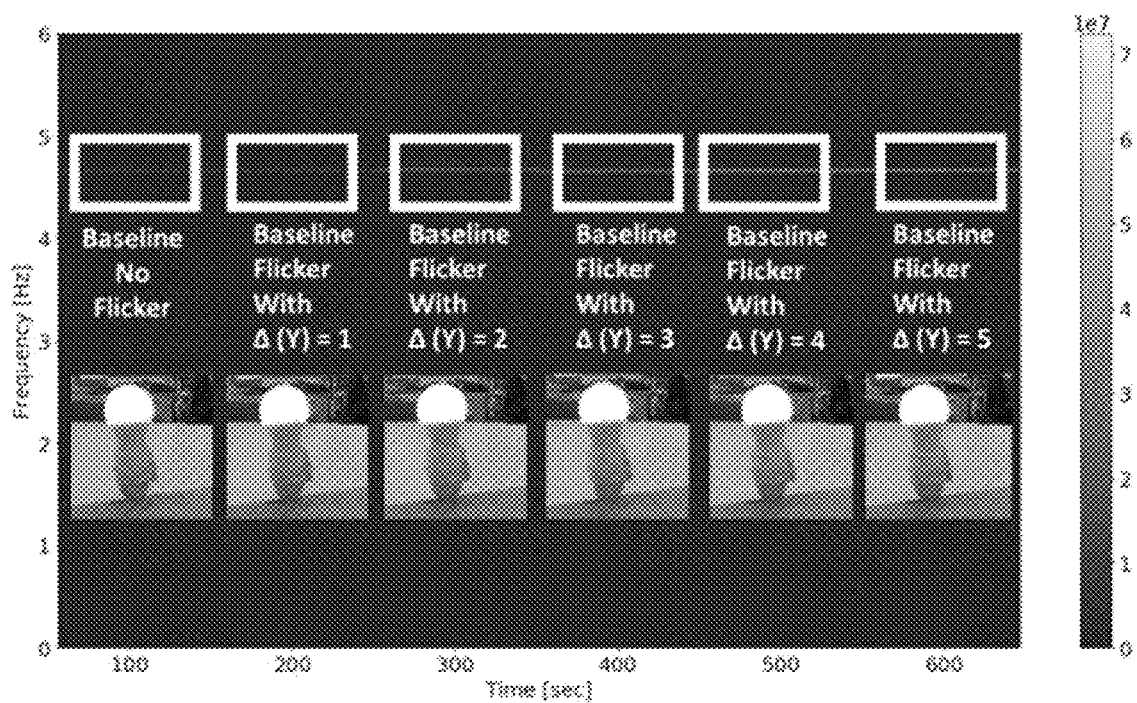
FIG. 15b is a spectrogram (power spectral density) of the intercepted bitrate signal from an experiment in which a smart bulb flickered between a baseline color and five similar hues (as can be seen in Table IV).
Figure 16A:
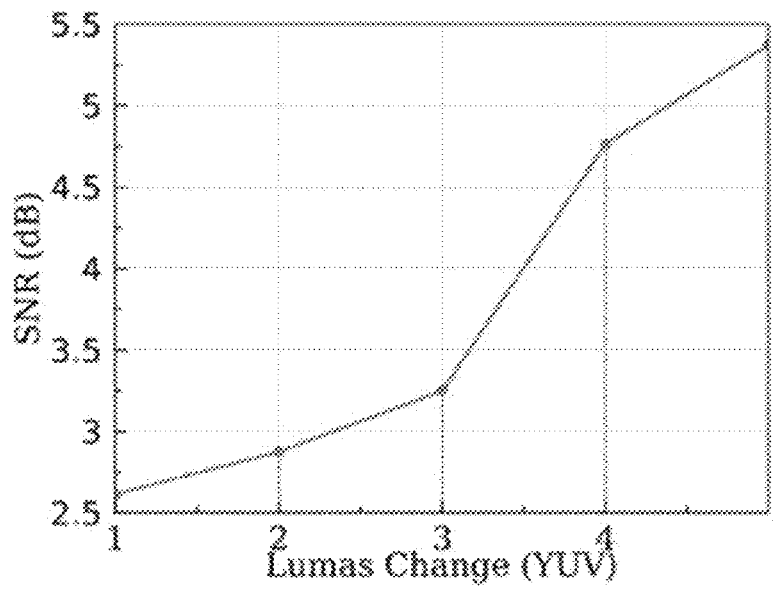
FIG. 16a is graph showing the SNR as a function of the change in the luma component and FIG. 16b is graph showing the SNR as a function of the change in the distance.
Figure 16B:
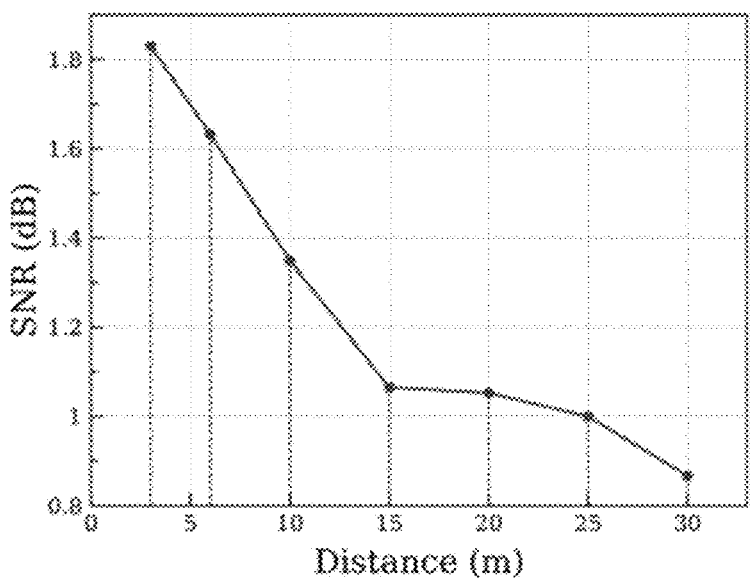

2) Results: The hues, as they were captured by the drone's video camera in the first experiment, are presented in FIG. 15b. The flickering cannot be detected by the human eye, because human vision is not sensitive enough to detect such subtle changes. The magnitude of the intercepted bitrate signal around 4.6 Hz was compared during the entire experiment. As can be seen in the spectrogram presented in FIG. 16b which was extracted from the intercepted traffic, the power of the magnitude around 4.6 Hz increases as much as the delta between the baseline and the second flickering color increases. The SNR as a function of the delta is presented is FIG. 16a. FIG. 16b shows the results of the second experiment. As can be seen, the SNR is greater than one up to a distance of 15 meters, so this method is only effective for a range shorter than the range of visible flickering (up to 50 meters). Based on this experiment it can be concluded that the physical stimulus can be disguised in a way that watermarks the intercepted traffic without the awareness of the drone's operator for much shorter ranges. In Appendix XVI, a method presented for hiding the physical stimulus.

The Classification Algorithm

The final component of the method of the invention for detecting privacy invasion attacks is a classification algorithm that uses watermark detection in order to determine whether a given FPV transmission is being used to video stream a victim/target. evaluate The performance of the privacy invasion attack detection method was evaluated for two use cases: when the target is a private house and when the target is a subject driving in his/her car.

Algorithm 4: Detecting Whether a POI is Being Streamed

```
1:   procedure IsTargetFilmed?(FpvChannel,
2:   FREQUENCY, STARTINGTIME)
3:     bitrate [ ] = extractBitrateSignal(FpvChannel)
4:     filtered [ ] = bandpassFilter(frequency,bitrate)
5:     before [ ] = subArray(bitrate,0,startingTime)
6:     after [ ] = subArray(bitrate,startingTime,N)
7:     N = length(bitrate)
8:     noiseMagnitude = FFT(before,30)[frequency]
9:     signalMagnitude = FFT(after,30)[frequency]
10:    SNR = signalMagnitude/noiseMagnitude
11:    return (SNR >= threshold)
```

Algorithm 4 compares the ratio between the magnitude around the flickering frequency after the periodic physical stimulus was launched (the signal) to the baseline magnitude around the same frequency before the periodic physical stimulus was launched (the baseline/noise). Algorithm 4 is applied after the Watermarker method has been called. The algorithm receives a suspicious FPV transmission (FpvChannel) and two parameters regarding the periodic physical stimulus: (1) its startingTime (EPOC time): the time that the physical stimulus was launched, and (2) frequency of operation. A bitrate signal is extracted from the intercepted FpvChannel (line 3). A bandpass filter is applied (line 4) to the bitrate signal around the operated frequency. The filtered signal is divided into two signals: before (line 5) and after (line 6) the periodic physical stimulus was launched. The magnitude around the operated frequency before the periodic physical stimulus was launched is given to noiseMagnitude (line 8), and accordingly, the magnitude around frequency after the periodic physical stimulus was launched is given to noiseMagnitude (line 9). Finally, the FpvChannel is classified as being used to stream the victim if the SNR is greater than a threshold (line 11).

Figure 17A:
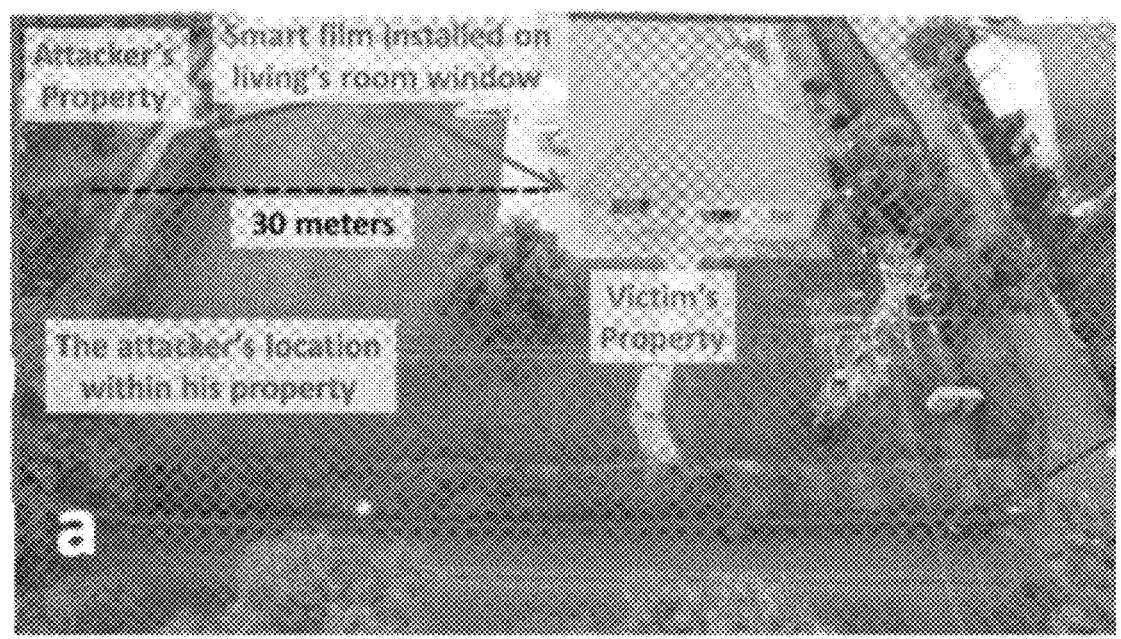
FIG. 17a is a photograph showing an attacker's location, Smart film installed on the living room window.
Figure 17B:
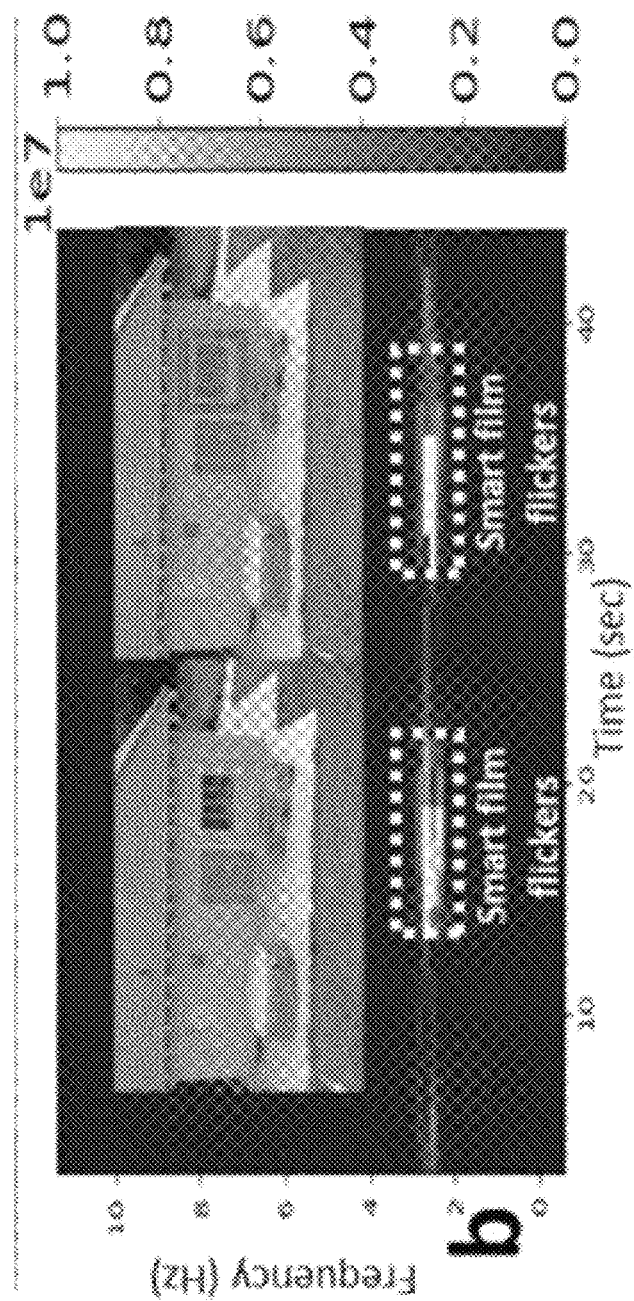
FIG. 17b is a photograph showing a spectrogram of the intercepted bitrate signal from a drone that was used by a malicious operator to spy on his/her neighbor (smart film was used to flicker twice).

1) Experimental Setup: In order to evaluate the performance of the method of the invention, two sets of experiments were conducted. The first set demonstrates how smart film attached to a window can be used as a means of detecting a privacy invasion attack conducted against a private house from a neighboring property. FIG. 17a presents the experimental setup in which the target is the victim's living room which is being video streamed by a malicious drone operator (nosey subject) who uses a DJI Mavic Pro (configured to video stream at 30 FPS and 720p) from his/her property (framed in red), at a distance of around 30 meters from the victim's window. A smart film (film that changes its state from transparent to mat and vice versa) that has been installed on the victim's window and connected to an RF controller can be considered as a Watermarker. A laptop (Dell Latitude) with an integrated NIC (used as a radio receiver) that is located in the victim's home and controls the smart film (i.e., can flicker it from mat to transparent at a given frequency) using a radio transmitter (a HackRF One was used, a software-defined radio) can be consider as an interceptor. The experiments show how a nosey subject (malicious drone operator) uses a drone to film his/her own yard (a legitimate use of a drone), and later uses the same drone, positioned within his/her own airspace, to peek at his/her neighbor (illegitimate use of a drone) by focusing on the neighbor's living room window. In this set of experiments, the drone was located on the property (and within the airspace) of the malicious drone operator (framed in red), 30 meters away from the neighbor's living room. The smart film is used as a flickering object that is operated at a frequency of 1.3 Hz. The spectrogram of the intercepted bitrate array from the entire experiment, with a bandpass filter around the 2.6 Hz frequency, is presented in FIG. 17b.

The second set of experiments demonstrates how a siren installed on the top of a car can be used as a means of detecting a privacy invasion attack conducted against a subject while he/she is driving in his/her car. FIG. 18a presents the experimental setup. The target (the victim's moving car) is being video streamed by a malicious drone operator who uses a DJI Spark (configured to video stream at 30 FPS) to spy on the victim. For the Watermarker a siren was used that is an LED strip connected to an Arudino Uno microcontroller (used to flicker the siren at a given frequency). A laptop (Dell Latitude) was used with an integrated NIC (used as a radio receiver) that is located in the victim's car and can trigger the siren as an interceptor. The experiments show how a victim that is being followed by a nosey malicious drone operator who uses the drone to video stream the victim while driving (the victim's route is presented in FIG. 18a). After 20 seconds of driving, the laptop triggers a green siren that is operated at a frequency of 3.9 Hz. The spectrogram of the intercepted bitrate array (intercepted by the laptop) from the entire experiment with a bandpass filter around the 7.8 Hz frequency is presented in FIG. 18.

Figure 19A:
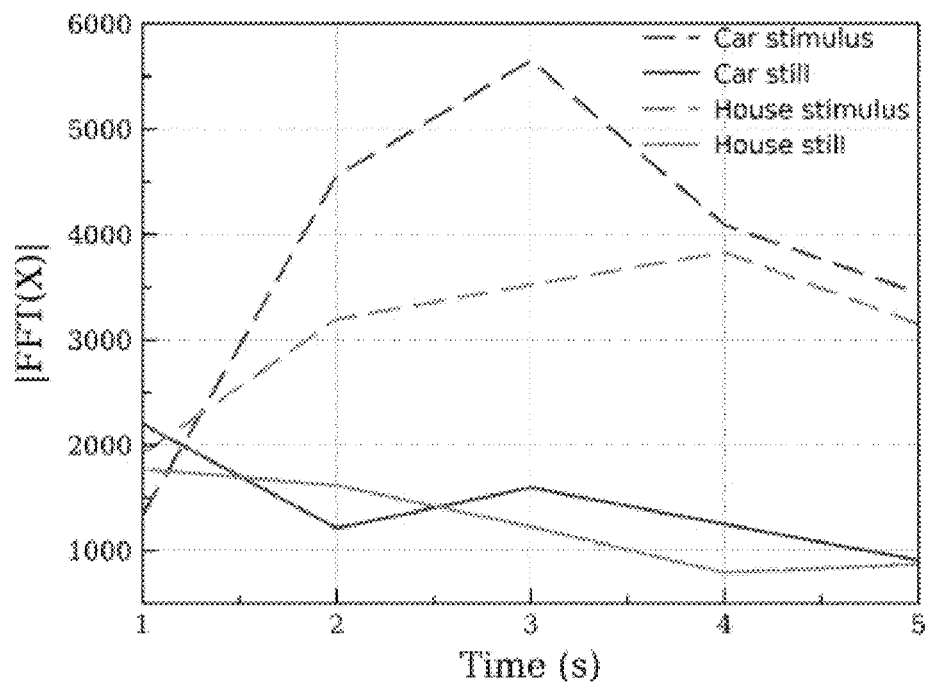
FIG. 19a shows extracted magnitudes around the flickering frequency as a function of the duration.

2) Results: Based on the intercepted bitrate arrays that were obtained from the two experiments, magnitudes were extracted around the watermarked frequencies before and after the physical stimulus was started for durations of 1-5 seconds. The results are presented in FIG. 19a. As can be seen in the figure, two seconds of the physical stimulus are enough for increasing the signal's magnitude (after the physical slim ulus began) over the baseline magnitude (before the physical stimulus began). In addition to the experiments that simulated illegitimate uses of a drone, experiments were conducted that simulate legitimate drone use as follows. In the private house experiment, an additional set of experiments was conducted in which the neighbor used his/her drone to film his/her own garden (legitimate use of a drone). In the car experiment, an additional set of experiments was conducted in which the drone was used to film its operator (legitimate use of a drone).

Figure 19B:
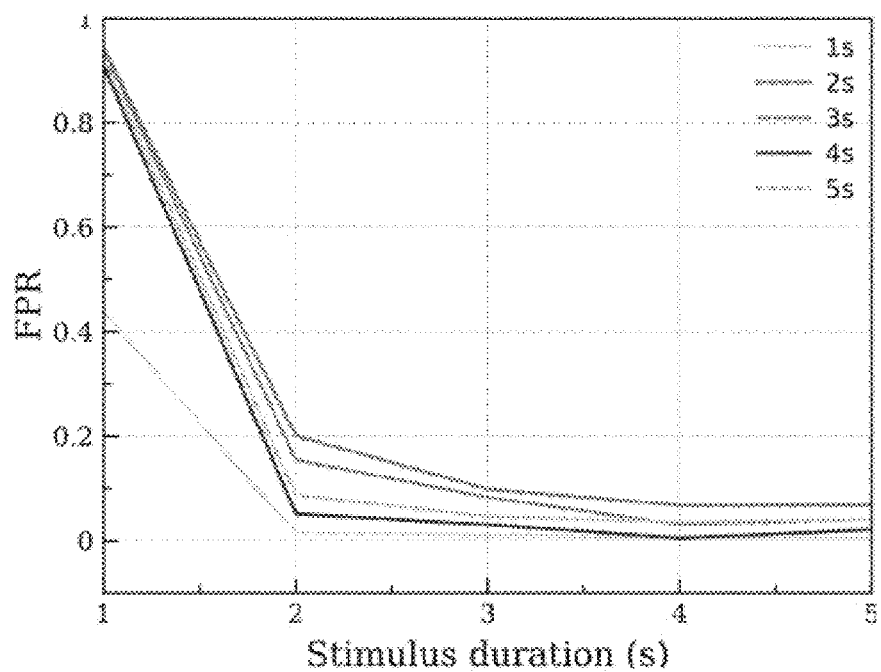
FIG. 19b shows false positive rate obtained by applying Algorithm 1 for a legitimate purpose in the private house experiment.
Figure 19C:
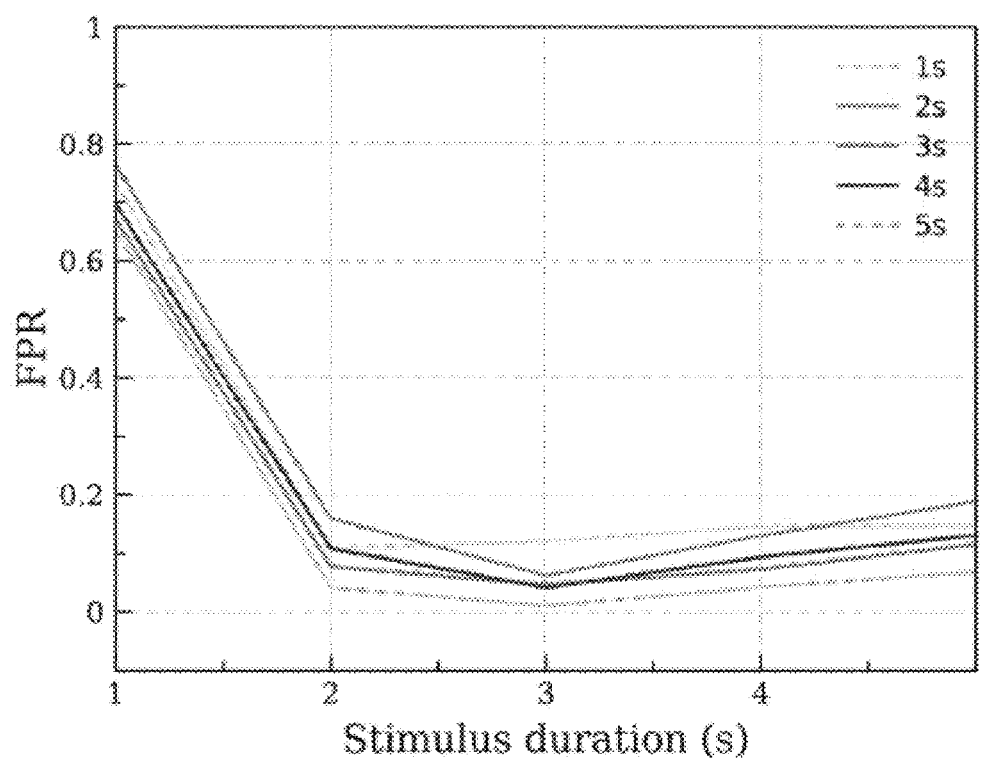
FIG. 19c shows false positive rate obtained by applying Algorithm 1 for a legitimate purpose in the car experiment.

A desired privacy invasion attack detection system is a system that can detect every privacy invasion attack. In order to accomplish this, the threshold variable from line 11 of Algorithm 4 was tuned to the minimum SNR calculated from the set of experiments that were conducted previously on the illegitimate use of a drone. By setting the parameter's threshold at the minimal SNR value observed by triggering a physical stimulus, we force the detection of each privacy invasion attack that occurs. In order to test the false alarms associated with this, the set of experiments that simulated legitimate drone use was applied. The intercepted bitrate array from the experiments that were conducted previously on the legitimate use of a drone were divided into a duration of 10 seconds. Algorithm 1 was applied on the intercepted signals with the baseline and signal magnitudes that were extracted from various durations (15 seconds for each). The FPR results of the private house experiment are presented in FIG. 19b, and the FPR results of the car experiment are presented in FIG. 19c. As can be seen from the results, the FPR rate goes below the value of 0.1 very quickly: within 2-3 seconds of flickering in the car experiment and within two seconds in the private house experiment. Based on these results, it can be concluded that a privacy invasion attack detection system that detects every privacy invasion attack can be tuned so that it leads to a minimal amount of false alarms.

Although the invention has been described in detail, nevertheless changes and modifications, which do not depart from the teachings of the present invention, will be evident to those skilled in the art. Such changes and modifications are deemed to come within the purview of the present invention and the appended claims.

It will be readily apparent that the various methods and algorithms described herein may be implemented by, e.g., appropriately programmed general purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, central processing units (CPUs), computing devices, microcontrollers, digital signal processors, or like devices.

The term "computer-readable medium" refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

Appendix I—Interception & Creating Bitrate Signal Script

Listing 1 presents the bash script that implements the process of interception.

1#!/bin/bash
2#start monitor mode
3airmon☐ng check kill
4airmon☐ng start wlan0
5#Capture packets of specific network
6airodump-ng--bssid $1--write capture
. pcap wlan0mon
7read-p "Press any key to exit monitor mode . . . "-n1-s
8#exit monitor mode
9airmon-ng stop wlan0mon
10service network-manager start
11rfkill unblock all Listing 1. Applying Interception Script The bash script presented in Listing 1 received the BSSID as the argument and creates a PCAP file that contains packets captured from the BSSID's network.

Listing 2 presents the bash script that implements the bitrate signal interception process 1#!/bin/bash
2prefix=12
3suffix=1
4interval=0.041666666667
5tshark-q-z'io,stat,'"$interval"-r"$1">"$1".txt-2
6lines=$(wc-1<"$1".txt)
7line_2_remove="$((lines-prefix))"
8echo$line_2_remove
9echo$lines
10tail--lines=$line_2_remove"$1".txt>tmp.txt
11lines=$(wc-1<tmp.txt)
12line_2_remove="$((lines-sefix))"
13head--lines=$line_2_removetmp.txt>tmp2.txt
14cut-f3-d'|'tmp2.txt>tmp3.txt
15cut-f4-d'|'tmp2.txt>tmp4.txt
16cattmp3.txt>packets.txt|tr-d"\t\n\r"
17cattmp4.txt>bytes.txt|tr-d"\t\n\r"
18echo'packets'|cat-packets.txt>temp&&mvtemppackets.txt
19echo'bytes'|cat-bytes.txt>temp&&mvtempbytes.txt
20paste-d",''packets.txtbytes.txt>>"$1".csv
21rmpackets.txtbytes.txt"$1".txttmp4.txttmp3.txttmp2.txttmp.txt
22paste-d",''-csv>>all.txt
23rm-.csv
24tr-d'"\t"<all.txt>aggregation.txt
25rmall.txt Listing 2. Interception and Creating Bitrate Signal Script The script presented in Listing 2 receives the path to the PCAP as the argument and creates a bitrate signal by aggregating all of the packets according to an interval parameter.

Appendix II—Locating Drone Experiment

TABLE VI
LOCATING DRONE EXPERIMENT-RESULTS

| | | | Real Drone Location | | | | | | |
|---|---|---|---|---|---|---|---|---|---|
| | Latitude | Longitude | Altitude (m) | Δ x (m) | Δ y (m) | Δ z (m) | r (m) | theta (°) | phi (°) |
| 1 | 31.2631 | 34.81051 | 0 | −10 | 0 | 0 | 10 | 0 | 0 |
| 2 | 31.2629 | 34.81051 | −4 | −9 | −5 | −4 | 11 | 21.2 | 29.1 |
| 3 | 31.26292 | 34.81041 | 1 | −6 | −8 | 1 | 10 | −5.7 | 53.1 |
| 4 | 31.26298 | 34.81035 | −2 | −4 | −10 | −2 | 11 | 10.5 | 68.2 |
| 5 | 31.26302 | 34.81031 | −7 | 1 | −10 | −7 | 12.2 | 34.9 | −84.3 |
| 6 | 31.26312 | 34.81031 | 2 | 4 | −9 | 2 | 10 | −11.5 | −66 |
| 7 | 31.26318 | 34.81033 | 0 | 7 | −7 | 0 | 9.9 | 0 | −45 |
| 8 | 31.26324 | 34.81037 | −4 | 8 | −6 | −4 | 10.8 | 21.8 | −36.9 |
| 9 | 31.26326 | 34.81039 | −3 | 0 | −10 | −3 | 10.4 | 16.7 | 0 |
| 10 | 31.2631 | 34.81031 | 2 | 9 | −4 | 2 | 10 | −11.5 | −24 |
| 11 | 31.26328 | 34.81043 | −6 | −5 | −9 | −6 | 11.9 | 30.2 | 60.9 |
| 12 | 31.263 | 34.81033 | −7 | −20 | 0 | −7 | 21.2 | 19.3 | 0 |
| 13 | 31.2627 | 34.81051 | 1 | −19 | 3 | 1 | 19.3 | −3 | −9 |
| 14 | 31.26272 | 34.81057 | −4 | −17 | −12 | −4 | 21.2 | 10.9 | 35.2 |
| 15 | 31.26276 | 34.81027 | −7 | −15 | −14 | −7 | 21.7 | 18.8 | 43 |
| 16 | 31.2628 | 34.81023 | −3 | −12 | −16 | −3 | 20.2 | 8.5 | 53.1 |
| 17 | 31.26286 | 34.81019 | −7 | −6 | −20 | −7 | 22 | 18.5 | 73.3 |
| 18 | 31.26298 | 34.81011 | −1 | 0 | −20 | −1 | 20 | 2.9 | 0 |
| 19 | 31.2631 | 34.81011 | −3 | 5 | −20 | −3 | 20.8 | 8.3 | −76 |
| 20 | 31.2632 | 34.81011 | −4 | 9 | −18 | −4 | 20.5 | 11.2 | −63.4 |
| 21 | 31.26328 | 34.81015 | −5 | 17 | −10 | −5 | 20.3 | 14.2 | −30.5 |
| 22 | 31.26344 | 34.81031 | −1 | −29 | −9 | −1 | 30.4 | 1.9 | 17.2 |
| 23 | 31.26252 | 34.81033 | −8 | −28 | −12 | −8 | 31.5 | 14.7 | 23.2 |
| 24 | 31.26254 | 34.81027 | 0 | −26 | −16 | 0 | 30.5 | 0 | 31.6 |
| 25 | 31.26258 | 34.81019 | −2 | −23 | −20 | −2 | 30.5 | 3.8 | 41 |
| 26 | 31.26264 | 34.81011 | −2 | −18 | −25 | −2 | 30.9 | 3.7 | 54.2 |
| 27 | 31.26274 | 34.81001 | −2 | −11 | −29 | −2 | 31.1 | 3.7 | 69.2 |
| 28 | 31.26288 | 34.20993 | 2 | −8 | −30 | 2 | 31.1 | −3.7 | 75.1 |
| 29 | 31.26294 | 34.80991 | −3 | 10 | −29 | −3 | 30.8 | 5.6 | −71 |
| 30 | 31.2633 | 34.80993 | 1 | 16 | −25 | 1 | 29.7 | −1.9 | −57.4 |

| | | | Predicted Drone Location | | | | | | | Error | | |
|---|---|---|---|---|---|---|---|---|---|---|---|---|
| | Latitude | Longitude | Altitude (m) | Δ x (m) | Δ y (m) | Δ z (m) | r (m) | theta (°) | phi (°) | x (m) | y (m) | z (m) |
| 1 | 31.26314 | 34.81048 | −3.4 | −13.6 | 3.1 | −3.4 | 14.3 | 13.9 | −12.8 | 12.7 | 9.5 | 11.9 |
| 2 | 31.26314 | 34.81059 | −7.8 | −12.4 | −8.1 | −7.8 | 16.7 | 27.9 | 33.1 | 11.5 | 9.4 | 14.6 |
| 3 | 31.26307 | 34.81056 | 4.7 | −2.8 | −5 | 4.7 | 7.3 | −39.4 | 60.9 | 10.5 | 9.3 | 13.4 |
| 4 | 31.26314 | 34.81064 | −5.6 | −7.6 | −13.1 | −5.6 | 16.1 | 20.2 | 60 | 12.7 | 9.6 | 12.7 |
| 5 | 31.26307 | 34.81058 | −10.6 | 4.6 | −7 | −10.6 | 13.5 | 51.7 | −56.3 | 13.3 | 9.2 | 13.1 |
| 6 | 31.26307 | 34.81057 | 5.5 | 7.5 | −5.7 | 5.5 | 10.9 | −30.5 | −37 | 12.3 | 11.2 | 12.5 |
| 7 | 31.26314 | 34.81055 | 3.6 | 3.5 | −3.8 | 3.6 | 6.3 | −35.2 | −47.4 | 12.3 | 10.2 | 13.3 |
| 8 | 31.26314 | 34.81061 | −7.7 | 4.3 | −9.3 | −7.7 | 12.8 | 37 | −65.1 | 13.6 | 10.9 | 13.8 |
| 9 | 31.26314 | 34.81065 | 0.9 | −3.4 | −13.3 | 0.9 | 13.7 | −3.7 | 75.5 | 11.8 | 10.7 | 15.1 |
| 10 | 31.26313 | 34.81058 | −1.8 | 5.7 | −6.9 | −1.8 | 9.1 | 11.2 | −50.3 | 10.7 | 8.4 | 14.3 |
| 11 | 31.26313 | 34.81064 | −9.4 | −8.3 | −12.3 | −9.4 | 17.6 | 32.5 | 56 | 10.7 | 10.7 | 11.9 |
| 12 | 31.26313 | 34.81048 | −3.6 | −23.2 | 3 | −3.6 | 23.7 | 8.8 | −7.3 | 10.5 | 9 | 11.5 |
| 13 | 31.26307 | 34.81045 | −2.8 | −15.5 | 6 | −2.8 | 16.9 | 9.6 | −21 | 12 | 8.9 | 14.7 |
| 14 | 31.26307 | 34.8106 | −7.6 | −13.6 | −8.7 | −7.6 | 17.8 | 25.4 | 32.7 | 11.8 | 10.8 | 13.3 |
| 15 | 31.26307 | 34.81068 | −10.2 | −11.4 | −17.2 | −10.2 | 23 | 26.3 | 56.5 | 13.3 | 10 | 10.1 |
| 16 | 31.26313 | 34.81064 | −6.4 | −15 | −12.7 | −6.4 | 20.7 | 18 | 40.4 | 8.8 | 10.7 | 11.4 |
| 17 | 31.26314 | 34.81074 | −3.5 | −9.4 | −23.2 | −3.5 | 25.3 | 7.9 | 67.9 | 11.9 | 10.5 | 12.2 |
| 18 | 31.26313 | 34.81068 | −4.6 | −3.3 | −17 | −4.6 | 18 | 15 | 79 | 10.9 | 8.8 | 13.2 |
| 19 | 31.26314 | 34.81068 | 0.2 | 1.1 | −16.6 | 0.2 | 16.6 | −0.7 | −86.2 | 15.1 | 11.6 | 10.3 |
| 20 | 31.26307 | 34.81066 | −0.4 | 12.6 | −14.8 | −0.4 | 19.5 | 1.1 | −49.6 | 13 | 10 | 13 |
| 21 | 31.26314 | 34.81058 | −8.7 | 13.6 | −6.7 | −8.7 | 17.4 | 30 | −26.3 | 11.9 | 10.9 | 13.8 |
| 22 | 31.26314 | 34.81064 | −5.1 | −32.5 | −12.3 | −5.1 | 35.1 | 8.3 | 20.7 | 11.9 | 10.6 | 16.4 |
| 23 | 31.26313 | 34.81066 | −4.4 | −31.2 | −14.8 | −4.4 | 34.9 | 7.2 | 25.4 | 10.5 | 8.1 | 13.3 |
| 24 | 31.26307 | 34.81064 | −3.7 | −22.6 | −13.1 | −3.7 | 26.3 | 8.1 | 30.1 | 11.9 | 8.5 | 13.9 |
| 25 | 31.26306 | 34.81074 | 2.1 | −19.3 | −23 | 2.1 | 30.1 | −3.9 | 50 | 13.9 | 8.9 | 16.5 |
| 26 | 31.26307 | 34.81073 | −5.8 | −14.6 | −21.9 | −5.8 | 26.9 | 12.5 | 56.4 | 11.8 | 9.6 | 14.7 |
| 27 | 31.26314 | 34.81077 | 1.7 | −14.4 | −26 | 1.7 | 29.8 | −3.2 | 61 | 11.8 | 8.8 | 13.6 |
| 28 | 31.26314 | 34.81078 | 5.8 | −11.5 | −26.9 | 5.8 | 29.8 | −11.2 | 66.8 | 12.4 | 9.9 | 14.4 |
| 29 | 31.26307 | 34.81083 | −6.6 | 13.6 | −32.2 | −6.6 | 35.5 | 10.7 | −67.1 | 12.9 | 9.9 | 12.8 |
| 30 | 31.26306 | 34.81073 | 4.5 | 19.8 | −21.7 | 4.5 | 29.8 | −8.7 | −47.6 | 14.8 | 10.8 | 12.3 |

TABLE VI

| | | LOCATING DRONE EXPERIMENT - RESULTS | | | | | | | | |
|---|---|---|---|---|---|---|---|---|---|---|
| | Real Drone Location | | | | | | | | Predicted Drone Location | |
| | Latitude | Longitude | Altitude (m) | Δ x (m) | Δ y (m) | Δ z (m) | r (m) | theta (°) | phi (°) | Latitude | Longitude |
| 1 | 31.2631 | 34.81051 | 0 | −10 | 0 | 0 | 10 | 0 | 0 | 31.26314 | 34.81048 |
| 2 | 31.2629 | 34.81051 | −4 | −9 | −5 | −4 | 11 | 21.2 | 29.1 | 31.26314 | 34.81059 |
| 3 | 31.26292 | 34.81041 | 1 | −6 | −8 | 1 | 10 | −5.7 | 53.1 | 31.26307 | 34.81056 |
| 4 | 31.26298 | 34.81035 | −2 | −4 | −10 | −2 | 11 | 10.5 | 68.2 | 31.26314 | 34.81064 |
| 5 | 31.26302 | 34.81031 | −7 | 1 | −10 | −7 | 12.2 | 34.9 | −84.3 | 31.26307 | 34.81058 |
| 6 | 31.26312 | 34.81031 | 2 | 4 | −9 | 2 | 10 | −11.5 | −66 | 31.26307 | 34.81057 |
| 7 | 31.26318 | 34.81033 | 0 | 7 | −7 | 0 | 9.9 | 0 | −45 | 31.26314 | 34.81055 |
| 8 | 31.26324 | 34.81037 | −4 | 8 | −6 | −4 | 10.8 | 21.8 | −36.9 | 31.26314 | 34.81061 |
| 9 | 31.26326 | 34.81039 | −3 | 0 | −10 | −3 | 10.4 | 16.7 | 0 | 31.26314 | 34.81065 |
| 10 | 31.2631 | 34.81031 | 2 | 9 | −4 | 2 | 10 | −11.5 | −24 | 31.26313 | 34.81058 |
| 11 | 31.26328 | 34.81043 | −6 | −5 | −9 | −6 | 11.9 | 30.2 | 60.9 | 31.26313 | 34.81064 |
| 12 | 31.263 | 34.81033 | −7 | −20 | 0 | −7 | 21.2 | 19.3 | 0 | 31.26313 | 34.81048 |
| 13 | 31.2627 | 34.81051 | 1 | −19 | 3 | 1 | 19.3 | −3 | −9 | 31.26307 | 34.81045 |
| 14 | 31.26272 | 34.81057 | −4 | −17 | −12 | −4 | 21.2 | 10.9 | 35.2 | 31.26307 | 34.8106 |
| 15 | 31.26276 | 34.81027 | −7 | −15 | −14 | −7 | 21.7 | 18.8 | 43 | 31.26307 | 34.81068 |
| 16 | 31.2628 | 34.81023 | −3 | −12 | −16 | −3 | 20.2 | 8.5 | 53.1 | 31.26313 | 34.81064 |
| 17 | 31.26286 | 34.81019 | −7 | −6 | −20 | −7 | 22 | 18.5 | 73.3 | 31.26314 | 34.81074 |
| 18 | 31.26298 | 34.81011 | −1 | 0 | −20 | −1 | 20 | 2.9 | 0 | 31.26313 | 34.81068 |
| 19 | 31.2631 | 34.81011 | −3 | 5 | −20 | −3 | 20.8 | 8.3 | −76 | 31.26314 | 34.81068 |
| 20 | 31.2632 | 34.81011 | −4 | 9 | −18 | −4 | 20.5 | 11.2 | −63.4 | 31.26307 | 34.81066 |
| 21 | 31.26328 | 34.81015 | −1 | 17 | −10 | −5 | 20.3 | 14.2 | −30.5 | 31.26314 | 34.81058 |
| 22 | 31.26344 | 34.81031 | −8 | −29 | −9 | −1 | 30.4 | 1.9 | 17.2 | 31.26314 | 34.81064 |
| 23 | 31.26252 | 34.81033 | 0 | −28 | −12 | −8 | 31.5 | 14.7 | 23.2 | 31.26313 | 34.81066 |
| 24 | 31.26254 | 34.81027 | −2 | −26 | −16 | 0 | 30.5 | 0 | 31.6 | 31.26307 | 34.81064 |
| 25 | 31.26258 | 34.81019 | −2 | −23 | −20 | −2 | 30.5 | 3.8 | 41 | 31.26306 | 34.81074 |
| 26 | 31.26264 | 34.81011 | −2 | −18 | −25 | −2 | 30.9 | 3.7 | 54.2 | 31.26307 | 34.81073 |
| 27 | 31.26274 | 34.81001 | −2 | −11 | −29 | −2 | 31.1 | 3.7 | 69.2 | 31.26314 | 34.81077 |
| 28 | 31.26288 | 34.80993 | 2 | −8 | −30 | 2 | 31.1 | −3.7 | 75.1 | 31.26314 | 34.81078 |
| 29 | 31.26294 | 34.80991 | −3 | 10 | −29 | −3 | 30.8 | 5.6 | −71 | 31.26307 | 34.81083 |
| 30 | 31.2633 | 34.80993 | 1 | 16 | −25 | 1 | 29.7 | −1.9 | −57.4 | 31.26306 | 34.81073 |

| | Predicted Drone Location | | | | | | | Error | | |
|---|---|---|---|---|---|---|---|---|---|---|
| | Altitude (m) | Δ x (m) | Δ y (m) | Δ z (m) | r (m) | theta (°) | phi (°) | x (m) | y (m) | z (m) |
| 1 | −3.4 | −13.6 | 3.1 | −3.4 | 14.3 | 13.9 | −12.8 | 12.7 | 9.5 | 11.9 |
| 2 | −7.8 | −12.4 | −8.1 | −7.8 | 16.7 | 27.9 | 33.1 | 11.5 | 9.4 | 14.6 |
| 3 | 4.7 | −2.8 | −5 | 4.7 | 7.3 | −39.4 | 60.9 | 10.5 | 9.3 | 13.4 |
| 4 | −5.6 | −7.6 | −13.1 | −5.6 | 16.1 | 20.2 | 60 | 12.7 | 9.6 | 12.7 |
| 5 | −10.6 | 4.6 | −7 | −10.6 | 13.5 | 51.7 | −56.3 | 13.3 | 9.2 | 13.1 |
| 6 | 5.5 | 7.5 | −5.7 | 5.5 | 10.9 | −30.5 | −37 | 12.3 | 11.2 | 12.5 |
| 7 | 3.6 | 3.5 | −3.8 | 3.6 | 6.3 | −35.2 | −47.4 | 12.3 | 10.2 | 13.3 |
| 8 | −7.7 | 4.3 | −9.3 | −7.7 | 12.8 | 37 | −65.1 | 13.6 | 10.9 | 13.8 |
| 9 | 0.9 | −3.4 | −13.3 | 0.9 | 13.7 | −3.7 | 75.5 | 11.8 | 10.7 | 15.1 |
| 10 | −1.8 | 5.7 | −6.9 | −1.8 | 9.1 | 11.2 | −50.3 | 10.7 | 8.4 | 14.3 |
| 11 | −9.4 | −8.3 | −12.3 | −9.4 | 17.6 | 32.5 | 56 | 10.7 | 10.7 | 11.9 |
| 12 | −3.6 | −23.2 | 3 | −3.6 | 23.7 | 8.8 | −7.3 | 10.5 | 9 | 11.5 |
| 13 | −2.8 | −15.5 | 6 | −2.8 | 16.9 | 9.6 | −21 | 12 | 8.9 | 14.7 |
| 14 | −7.6 | −13.6 | −8.7 | −7.6 | 17.8 | 25.4 | 32.7 | 11.8 | 10.8 | 13.3 |
| 15 | −10.2 | −11.4 | −17.2 | −10.2 | 23 | 26.3 | 56.5 | 13.3 | 10 | 10.1 |
| 16 | −6.4 | −15 | −12.7 | −6.4 | 20.7 | 18 | 40.4 | 8.8 | 10.7 | 11.4 |
| 17 | −3.5 | −9.4 | −23.2 | −3.5 | 25.3 | 7.9 | 67.9 | 11.9 | 10.5 | 12.2 |
| 18 | −4.6 | −3.3 | −17 | −4.6 | 18 | 15 | 79 | 10.9 | 8.8 | 13.2 |
| 19 | 0.2 | 1.1 | −16.6 | 0.2 | 16.6 | −0.7 | −86.2 | 15.1 | 11.6 | 10.3 |
| 20 | −0.4 | 12.6 | −14.8 | −0.4 | 19.5 | 1.1 | −49.6 | 13 | 10 | 13 |
| 21 | −8.7 | 13.6 | −6.7 | −8.7 | 17.4 | 30 | −26.3 | 11.9 | 10.9 | 13.8 |
| 22 | −5.1 | −32.5 | −12.3 | −5.1 | 35.1 | 8.3 | 20.7 | 11.9 | 10.6 | 16.4 |
| 23 | −4.4 | −31.2 | −14.8 | −4.4 | 34.9 | 7.2 | 25.4 | 10.5 | 8.1 | 13.3 |
| 24 | −3.7 | −22.6 | −13.1 | −3.7 | 26.3 | 8.1 | 30.1 | 11.9 | 8.5 | 13.9 |
| 25 | 2.1 | −19.3 | −23 | 2.1 | 30.1 | −3.9 | 50 | 13.9 | 8.9 | 16.5 |
| 26 | −5.8 | −14.6 | −21.9 | −5.8 | 26.9 | 12.5 | 56.4 | 11.8 | 9.6 | 14.7 |
| 27 | 1.7 | −14.4 | −26 | 1.7 | 29.8 | −3.2 | 61 | 11.8 | 8.8 | 13.6 |
| 28 | 5.8 | −11.5 | −26.9 | 5.8 | 29.8 | −11.2 | 66.8 | 12.4 | 9.9 | 14.4 |
| 29 | −6.6 | 13.6 | −32.2 | −6.6 | 35.5 | 10.7 | −67.1 | 12.9 | 9.9 | 12.8 |
| 30 | 4.5 | 19.8 | −21.7 | 4.5 | 29.8 | −8.7 | −47.6 | 14.8 | 10.8 | 12.3 |

The invention claimed is:

1. A computing system comprising:
   at least one processor; and
   at least one memory communicatively coupled to the at least one processor comprising computer-readable instructions that when executed by the at least one processor cause the computing system to implement a method of detecting a privacy invasion attack of a point of interest (POI), the method comprising:
   (i) intercepting radio transmissions and identifying if a radio transmission is a First-Person-View (FPV) video transmission;
   (ii) if not active, triggering a periodic physical stimulus associated with said POI, at a given frequency for a given duration;
   (iii) verifying if there is a correlation between the radio transmission and the periodic physical stimulus; and
   (iv) issuing a privacy invasion attack notification if a correlation is determined between the radio transmission and the periodic physical stimulus.

2. The computing system of claim 1, wherein the video transmission is from a camera on an Unmanned Aerial Vehicle (UAV).

3. The computing system of claim 1, wherein the FPV video transmission is a Wi-Fi FPV video transmission.

4. The computing system of claim 1, wherein the POI is a location, an object a person or any combination thereof.

5. The computing system of claim 1, wherein identifying if a radio transmission is an FPV video transmission is done by first assessing that a connected Media Access Control (MAC) address associated with the radio transmission is of a moving object, and then if the transmission rates correspond to known UAV frames per second (FPS) video rates.

6. The computing system of claim 1, wherein said periodic physical stimulus is a square wave.

7. The computing system of claim 1, wherein said periodic physical stimulus is a flickering light.

8. The computing system of claim 7, wherein said flickering light comprises LED strips, smart bulbs, a portable projector, smart film and other devices that can be programmed to change their color.

9. The computing system of claim 7, wherein said flickering light is an infra-red light.

10. The computing system of claim 7, wherein said flickering light alternates between two shades of the same color, such as the human eye cannot differentiate between the two shades.

11. The computing system of claim 1, comprising more than one periodic physical stimuli.

12. The computing system of claim 1, further comprising calculating the angle between the UAV and a periodic physical stimulus.

13. The computing system of claim 1, further comprising calculating the UAV's distance to a periodic physical stimulus.

14. The computing system of claim 1, further comprising calculating longitude, latitude and altitude of said UAV.

15. A computer system for identification of privacy invasion attacks of a POI, comprising a processor and a memory communicatively coupled to the processor, the system comprising:
   (i) an interceptor comprising an RF scanner, an antenna and amplifier;
   (ii) a watermarker associated with said POI for emitting a periodic physical stimulus at a given frequency for a given duration; and
   (iii) a controller adapted for reviewing radio transmissions read by the interceptor and identifying if a radio transmission is an FPV video transmission; if the watermarker is not active, activating the watermarker; verifying if there is a correlation between the radio transmission and the periodic physical stimulus; and issuing a privacy invasion attack notification if a correlation is determined between the radio transmission and the periodic physical stimulus.

16. The computer system of claim 15, wherein said periodic physical stimulus is a square wave.

17. The computer system of claim 15, wherein said periodic physical stimulus is a flickering light.

18. The computer system of claim 17, wherein said flickering light comprises LED strips, smart bulbs, a portable projector, smart film and other devices that can be programmed to change their color.

19. The computer system of claim 17, wherein said flickering light is an infra-red light.

20. The computer system of claim 15, further comprising calculating longitude, latitude and altitude of said UAV.

* * * * *